US007644182B2

(12) United States Patent
Banerjee et al.

(10) Patent No.: US 7,644,182 B2
(45) Date of Patent: Jan. 5, 2010

(54) RECONFIGURING A MULTICAST TREE

(75) Inventors: Sujata Banerjee, Sunnyvale, CA (US);
Sung-Ju Lee, Los Altos, CA (US);
Zhichen Xu, San Jose, CA (US);
Chunqiang Tang, Rochester, NY (US);
Zhiheng Wang, Ann Arbor, MI (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 963 days.

(21) Appl. No.: 10/797,200

(22) Filed: Mar. 11, 2004

(65) Prior Publication Data
US 2005/0201278 A1 Sep. 15, 2005

(51) Int. Cl.
*G06F 15/173* (2006.01)

(52) U.S. Cl. .............. 709/242; 709/239; 709/205; 709/223; 709/224; 370/236; 370/238

(58) Field of Classification Search ............ 709/238, 709/242, 205, 239, 233, 223; 370/236, 238
See application file for complete search history.

(56) References Cited

U.S. PATENT DOCUMENTS

| 5,606,669 | A  | * | 2/1997  | Bertin et al.   | 709/223 |
|-----------|----|---|---------|-----------------|---------|
| 6,751,661 | B1 | * | 6/2004  | Geddes          | 709/223 |
| 7,031,288 | B2 | * | 4/2006  | Ogier           | 370/338 |
| 7,035,933 | B2 | * | 4/2006  | O'Neal et al.   | 709/233 |
| 7,203,743 | B2 | * | 4/2007  | Shah-Heydari    | 709/223 |
| 7,233,991 | B2 | * | 6/2007  | Adhikari        | 709/224 |
| 7,327,683 | B2 | * | 2/2008  | Ogier et al.    | 370/236 |
| 2003/0012132 | A1 | * | 1/2003  | Novaes       | 370/225 |
| 2003/0051051 | A1 | * | 3/2003  | O'Neal et al.| 709/242 |
| 2004/0156384 | A1 | * | 8/2004  | Rune et al.  | 370/432 |
| 2005/0157660 | A1 | * | 7/2005  | Mandato et al.| 370/254 |
| 2005/0283525 | A1 | * | 12/2005 | O'Neal et al.| 709/223 |
| 2006/0212596 | A1 | * | 9/2006  | O'Neal et al.| 709/233 |

OTHER PUBLICATIONS

Xu, Zhichen; Tang, Chunqiang; Wang, Zhiheng; Banerjee, Sujata; Lee, Sung-Ju, "Receiver Initiated Just-in-Time Adapdation for Rich Media Distribution", Mar. 10, 2003, HP labs Technical Reports, HPL-2002-314R1, all pages.*

Xu, Zhichen; Mahalingam, Mallik; Karlsson, Magnus, "Turning Heterogeneity into an Advantage in Overlay Routing", Mar. 4, 2003, HP labs Technical Reports, HPL-2002-126R2, all pages.*

Banerjee, Suman; Kommareddy, Christopher; Kar, Koushik; Bhattacharjee, Bobby; Khuller, Samir, "Construction of an Efficient Overlay Multicast Infrastructure for Real-time Applications", Apr. 2003, IEEE INFOCOM 2003, all pages.*

Roy, Sumit; Shen, Bo; Sundaram, Vijay, "Application Level Hand-off Support for Mobile Media Transcoding Sessions", May 12-14, 2002, NOSSDAV'02, all pages.*

(Continued)

*Primary Examiner*—Bunjob Jaroenchonwanit
*Assistant Examiner*—Hua Fan

(57) ABSTRACT

A multicast tree is provided in an application multicast network. A child node in the multicast tree detects a degradation of quality of service associated with a service being received at the child node. The child node determines whether the degradation of quality of service is resulting from a child-parent link or an upstream link in the multicast tree.

23 Claims, 12 Drawing Sheets

OTHER PUBLICATIONS

Xu, Zhichen; Tang, Chunqiang; Zhang, Zheng, "Building Topology-Aware Overlays using Global Soft-State", Oct. 11, 2002, HP labs Technical Reports, HPL-2002-281, all pages.*

S. Banerjee et al., "Scalable Application Layer Multicast", Aug. 2002, In Proceedings of ACM SIGCOMM.

S. Banerjee et al., "Construction of an Efficient Overlay Multicast Infrastructure for Real-Time Applications", Apr. 2003, In Proceedings of INFOCOM.

K. Calvert, et al., "Modeling Internet Topology", Jun. 1997, IEEE Communications Magazine.

M. Castro et al., "Scribe: A Large-Scale and Decentralized Application-Level Multiccast Infrastructure", Oct. 2002, IEEE JSAC, 20(8).

Y. Chawathe, "Scattercast: An Adaptive Broadcast Distribution Framework", 2002, ACM Multimedia Systems Journal.

Y. Chu et al., "A Case for End System Multicast", Oct. 2002, IEEE JSAC, 20(8).

P. Francis, "Yoid: Your Own Internet Distribution", Mar. 2001.

X. Fu et al., "CANS: Composable, Adaptive Network Services Infrastructure", Mar. 2001, In Proceedings of USITS.

S. D. Gribble et al., "The Ninja Architecture for Robust Internet-Scale Systems and Services", Mar. 2001, Computer Networks, 35(4).

J. Jannotti et al., "Overcast: Reliable Multicasting With an Overlay Network", Oct. 2002, In Proceedings of USENIX OSDI.

J. Jin et al., "On Construction of Service Multicast Trees", May 2003, In Proceedings of IEEE ICC.

J. Liebeherr et al., "Application-Layer Multicasting with Delaunay Triangulation Overlays", Oct. 2002, IEEE JSAC, 20(8).

T. Ng et al., "Predicting Internet Network Distance with Coordinates-Based Approaches", Jun. 2002, In Proceedings of IEEE INFOCOM.

V. Padmanabhan et al., "Distributing Streaming Media Content Using Cooperative Networking", May 2002, In Proceedings of ACM, NOSSDAV.

D. Pendarakis et al., "ALMI: An Application Level Multicast Infrastructure", Mar. 2001, In Proceedings of USENIX USITS.

S. Ratnasamy et al., "A Scalable Content Addressable Network", Aug. 2001, In Proceedings of ACM SIGCOMM.

S. Ratnasamy et al., "Topologically-Aware Overlay Construction and Server Selection", Jun. 2002, In Proceedings of IEEE INFOCOM.

S. Ratnasamy et al., "Application-Level Multicast Using Content-Addressable Networks", Nov. 2001, In Proceedings of NGC.

A. Rowstron et al., "Pastry: Scalable, Distributed Object Location and Routing for Large-Scale Peer-to-Peer Systems", Nov. 2001, In Proceedings of IFIP/ACM Middleware.

S. Roy et al., "Application Level Hand-Off Support for Mobile Media Transcoding Sessions", May 2002, In Proceedings of ACM NOSSDAV.

I. Stoica et al., "Chord: A Scalable Peer-to-Peer Lookup Service for Internet Applications", Aug. 2001, In Proceedings of ACM SIGCOMM.

D. Xu et al., "Finding Service Paths in a Media Service Proxy Network", Jan. 2002, In Proceedings of SPIE/ACM MMCN.

Z. Xu et al., "Receiver Initiated Just-in-Time Adaptation for Rich Media Distribution", Nov. 2002, Technical Report HPL-2002-314R1, HP Laboratories.

Z. Xu et al., "Building Topology-Aware Overlays Using Global Soft-State", May 2003, In Proceedings of IEEE ICDCS.

B. Zhang et al., "Host Multicast: A Framework for Delivering Multicast to End Users", Jun. 2002, In Proceedings of IEEE INFOCOM.

* cited by examiner

RECONFIGURING A MULTICAST TREE

TECHNICAL FIELD

The technical field relates generally to networks. More particularly, the technical field relates to multicast networks.

BACKGROUND

The Internet, as it has grown considerably in size and popularity, is being used to provide various services and applications to users. Diverse applications, such as streaming a short movie demonstrating how to assemble a piece of furniture, taking a virtual tour of a real estate property or a scenic spot, watching a live performance of an artist, and participating in a networked multi-user computer game or conference, are all available to users via the Internet.

An important trend is that users are no longer satisfied with receiving services that are targeted at mass audiences. Users are demanding services that are tailored to their individual needs. For example, a user may desire to receive content in a particular language, or a user may require a transcoded-down version of a movie to view on a personal digital assistant (PDA). With the proliferation of personalized services, an important challenge facing future network infrastructure is balancing the tradeoffs between providing individualized services to each user and making efficient use of network resources. Due to high bandwidth requirements and intensive computations incurred by multimedia applications, traditional unicast delivery of services may not be able to meet the transmission requirements of individualized services and is not scalable to efficiently meet the demands of a large number of service providers and users.

Network layer multicasting, also known as IP multicasting, is more scalable and more efficient than unicast delivery of services. However, IP multicasting is not widely supported in the Internet infrastructure and is not widely used in private networks. In addition, services, such as multimedia applications, typically have stringent delivery requirements for maintaining the perceptual quality of the delivered multimedia as seen by a user. Traditional IP multicast trees may not support a level of end-to-end quality of service (QoS), which may be needed for the delivery of certain services. In addition, tree reconfiguration, which is performed periodically in conventional IP multicasting for network maintenance, may cause further degradation of the quality of delivered services.

SUMMARY OF THE EMBODIMENTS

According to an embodiment, a method includes detecting a degradation of QoS associated with a service being received at a child node and determining whether the degradation of QoS is resulting from a child-parent link or an upstream link in the multicast tree.

According to another embodiment, a method includes detecting an occurrence of a predetermined condition in an application layer multicast network, and determining whether to reconfigure the multicast tree in response to detecting the occurrence of the predetermined condition.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF THE EMBODIMENTS

Figure 1:
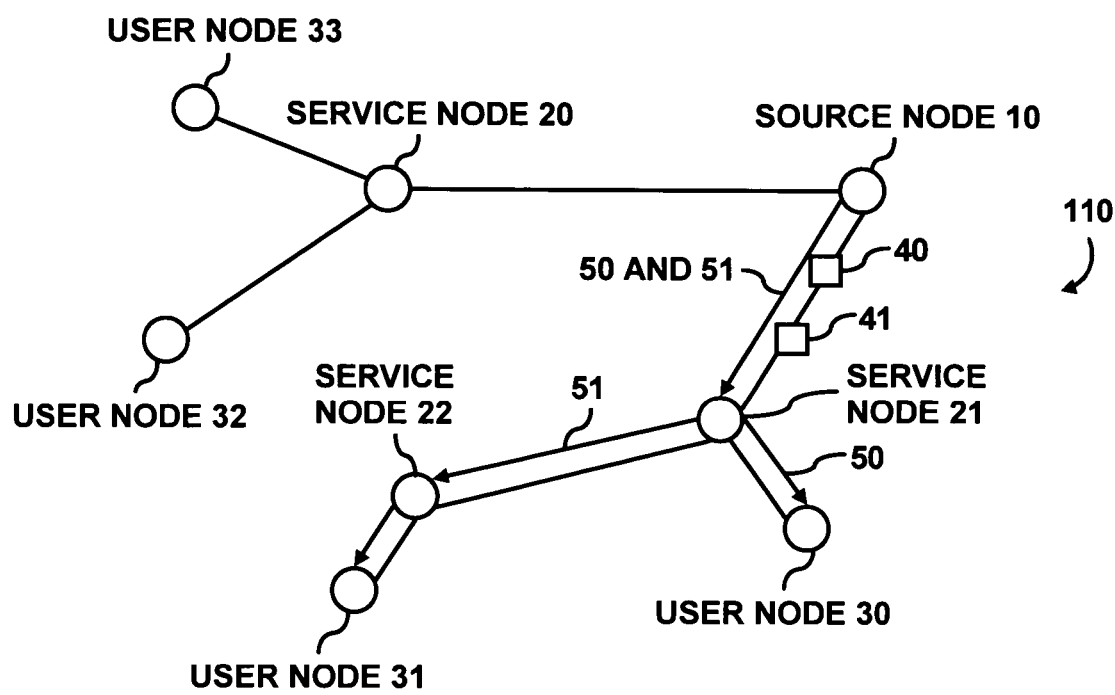
FIG. 1 illustrates a multicast tree in an application layer multicast network, according to an embodiment.

For simplicity and illustrative purposes, the principles of the embodiments are described. However, one of ordinary skill in the art would readily recognize that the same principles are equally applicable to, and can be implemented in, all types of network systems, and that any such variations do not depart from the true spirit and scope of the embodiments of the invention. Moreover, in the following detailed description, references are made to the accompanying figures, which illustrate specific embodiments. Electrical, mechanical, logical and structural changes may be made to the embodiments without departing from the spirit and scope of the embodiments of the invention.

According to an embodiment, an application layer multicast network is used to deliver services to nodes in a network. The application layer multicast network is highly scalable and able to accommodate the stringent requirements of real-time multimedia and other types of services.

In the application layer multicast network, multicast tree reconfigurations are performed that can minimize service quality degradation and/or improve the efficiency of multicast trees. In one example, a multicast tree reconfiguration is performed based on a degradation of QoS perceived at a node. Perceived QoS may be determined by a user. For example, a user viewing streaming video may notice periodic pauses in the received video. Perceived QoS may include measuring predetermined QoS characteristics and determining whether the QoS characteristics fall below a threshold. QoS characteristics include metrics related to a routing path or node in a multicast tree delivering a service, such as storage capacity, computing capacity, load, delay to the root, bottleneck bandwidth, and number of service nodes in a service path.

When a perceived degradation of QoS for received services is detected, the node requests a tree reconfiguration. A determination is made as to whether the cause of the degradation of QoS is a child-parent link or an upstream link in the multicast tree. A link, for example, includes the routing path between the nodes and also the nodes. A child-parent link includes the routing path between the child and parent nodes and also the child and parent nodes. An upstream link may include a link upstream from the child-parent link in the multicast tree.

A problematic link in the multicast tree may result from a metric associated with the routing path, such as delay in the routing path, or a metric associated with a node in the link, such as computing capacity. In one embodiment, overall disruption in service is minimized by locating a problematic link in the multicast tree causing the degradation of QoS and by having the node incident to that link adapt. For example, when a link close to the root becomes unavailable, instead of having every node downstream of the problematic link find a new parent, the node incident to the problematic link finds a new parent. In addition, information in a global information table is used to find a new service physically close to the node for maximizing the efficiency of the multicast tree. As a result, tree reconfigurations are performed in a short timescale as opposed to conventional tree reconfigurations which typically take several seconds and have a tendency to degrade the quality of received services. In addition, reconfiguration based on a perceived QoS avoids the overhead of unnecessary changes to the tree that do not affect QoS, such as reconfigurations performed periodically or in response to increased round-trip-times (RTT).

In another embodiment, a multicast tree reconfiguration is performed on a demand-driven basis. A node stores reconfiguration state information in the global information table associated with conditions that may invoke a reconfiguration possibly resulting in improved efficiency and/or QoS. For example, as nodes join and leave the network, reconfiguration state information for a given node is evaluated. If a new node is identified that is close to the given node and that is operable to satisfy service requirements for the given node, the given node may decide to connect to the new node to receive services if it is more beneficial, such as to improve QoS.

A global information table, including node profiles, is used to construct and reconfigure multicast trees in the application layer multicast network. Node profiles in the global information table include, for example, location information, service information for a node in a multicast tree, QoS characteristics which may be related to measured service path metrics and node metrics, and reconfiguration state information. These node profiles are used to select a node in the multicast tree to provide services to a given node. For example, a node desires to receive a particular service. The node may be a new node joining the network and requesting the service. This may also include an existing node requesting the service from a different service node during a multicast tree reconfiguration, such as in response to a perceived QoS degradation. The node queries the global information table to identify a closest node in a multicast tree that is operable to provide the requested service while satisfying specified QoS characteristics associated with delivery requirements of the service. The node desiring to receive the service may generate a request for the service including the requested service and specified QoS characteristics. A service path in the multicast tree is built from a node identified from the global information table to the node requesting the service.

An enhanced landmark clustering technique may be used to find a closest node for providing a requested service. Landmark clustering is used to select a set of candidate nodes from the global information table operable to provide the service that are closest to a given node requesting the service. A clustering algorithm is applied to reduce the size of the set of candidate nodes to a subset of the set of candidate nodes. The node requesting the service measures distances to each of the subset of candidate nodes. The closest node that satisfies specified QoS characteristics associated with providing and delivering the service is selected.

A distributed hash table (DHT) overlay network is used to store the global information table. DHT overlay networks are logical representations of an underlying physical network, which provide, among other types of functionality, data placement, information retrieval, and routing. DHT overlay networks have several desirable properties, such as scalability, fault-tolerance, and low management costs. Some examples of DHT overlay networks that may be used in the embodiments of the invention include content-addressable-network (CAN), PASTRY, CHORD, and expressway routing CAN (eCAN), which is a hierarchical version of CAN. The eCAN overlay network is further described in U.S. patent application Ser. No. 10/231,184, entitled, "Expressway Routing Among Peers", filed on Aug. 29, 2002, having a common assignee as the present application, and is hereby incorporated by reference in its entirety.

Nodes in the multicast tree and other nodes in the network are selected to be DHT nodes for implementing the overlay network and storing the global information table. The DHT nodes store node profiles of nodes in the multicast tree. In particular, a landmark vector of a node is used as a key to identify a location in the overlay network for storing the node's profile, such that node profiles for nodes that are physically close to each other are stored near each other in the overlay network. As a result, a node can find information about close-by nodes, such as for constructing a service path in a multicast tree, in an efficient and scalable manner.

When a DHT node in the overlay network processes a received request for services, the DHT node attempts to account for both the user requirements in the request and the tree quality. For example, the DHT node searches the global information table to find existing service paths near the requesting node that satisfy the request. If existing service paths are not available, then service nodes near the requesting node that can satisfy the request are identified from the global information table.

1. Application Layer Multicasting

FIG. 1 illustrates a multicast tree 110 in an application layer multicast network 100. The multicast tree 110 includes a source node 10 at the root. The source node 10 is a node that initially generates content, such as streaming video, music files, etc. Content other than multimedia may also be generated from the source node 10. The multicast tree 110 also includes service nodes 20-22 and user nodes 30-33. A service is a function that operates on an input and produces an output. Examples of services include transcoding, encryption, image repair and analysis, and error correction. Some services are reversible, such that the output of the initial service may be converted back to the input. For example, an encryption service may also provide de-encryption.

The service nodes 20-22 provide services to other service nodes and user nodes. The user nodes 30-33 are nodes used by a user. A node is any device that may send and/or receive messages via the network. Examples of nodes include routers, servers, and end-user devices, such as PDA's, personal computers, and cellular phones.

Routers 40-42 are shown on the service path 51 to illustrate the difference between conventional network-layer multicasting, also known as IP multicasting, and application layer multicasting. In conventional network-layer multicasting, only a single homogenous service is provided, which is data packet delivery. In application layer multicasting provided in the multicast tree 110, heterogeneous services are available to users. Different users may have different service requirements when accessing the same content from the source node 10. For example, the user node 31 requires the content from the source node 10 to be transcoded for a particular type of end-user device and encrypted, and the user node 30 requires the content to be transcoded for the same type of end-user device. Transcoding is a technology used to adapt content so that it can be viewed on any of the increasingly diverse devices on the market. Transcoding servers and services reformat material that would otherwise have to be developed separately for display on different platforms.

Assuming the service node 21 provides the transcoding service requested by the user nodes 30 and 31, service paths 50 and 51 are created through the service node 21 for the user nodes 30 and 31 respectively. The service path 51 for the user node 31 continues through the service node 22 providing the encryption service requested by the user node 31. A service path in the multicast tree 110 is a data path between end hosts, whereby an end host, for example, may include a source node, service node or user node.

In network layer multicasting, data packets are replicated at routers in the network and transmitted to members of a multicast group. In application layer multicasting, data packets are replicated at end hosts, rather than at routers. Referring to FIG. 1, data packets are replicated at the service node 21. If network layer multicasting were used, packets would be duplicated at the routers 40-42 if members of the multicast group were connected to the routers 40-42. Thus, application layer multicasting does not change the network infrastructure, such as by requiring multicast routers, because multicasting forwarding functionality is implemented through the end hosts.

It will be apparent to one of ordinary skill in the art that the multicast tree 110 is a relatively small multicast tree in the network 100. The network 100 may include tens of thousands of nodes with multicast trees delivering services to much larger groups. Examples of applications that may effectively utilize application layer multicasting in the network 100 are a ticker service providing real-time stock quotes over the Internet to a large number of users, a news service delivering news to users or a popular Internet radio site.

2. Global Information Table

According to an embodiment, nodes in the network 100 use a global information table stored in a DHT overlay network to locate desired services. A node joining the network 100 determines its physical location in the network 100, and uses the physical location to query the global information table to identify a closest service node that can provide a desired service meeting predetermined QoS characteristics, also referred to as service requirements.

The global information table includes, for example, IDs, measured QoS characteristics, location information, service information for a node in a multicast tree, and reconfiguration state information. By way of example and not limitation, a global information schema is shown in table 1. Other items may be included in the schema as needed.

TABLE 1

| ITEMS | DESCRIPTION |
| --- | --- |
| ID | Node identifier and service path identifier. |
| Landmark Vector | Node's physical location in the network, i.e., location information for the node. |
| Services Provided | Services available to be applied by the service node. |
| QoS Characteristics | QoS characteristics of the node or path, such as measured node metrics or measured routing path metrics. |
| Reconfiguration State Information | Conditions specified by the node that may invoke reconfiguration of the multicast tree. |

A physical location of a node, also referred to herein as the node's location in the network, is the node's location in the network relative to other nodes in the network. For example, location information for the node may be determined by measuring distances to other nodes in the network, such as global landmark nodes and local landmark nodes. The location information may be used as an estimation of the node's physical location in the network. Distance to a node may be measured using a network metric such as round-trip-time or network hops. Distances between nodes and associated physical locations of nodes may not be the same as geographical distances between nodes and geographical locations of the nodes, because distances are measured in terms of a network metric, such as round-trip-time or network hops, and not measured in terms of a geographical distance metric, such as kilometers or miles.

Global landmark nodes and local landmark nodes may be randomly selected from the nodes in a network. Almost any node in the network may be selected to be a global landmark node or a local landmark node. The number of nodes selected to be local landmark nodes and global landmark nodes is generally much smaller than the total number of nodes in the network. Also, the total number of global landmark nodes in the network is generally smaller than the number of local landmark nodes. The number of global and local landmark nodes used in the network may depend on the desired accuracy of the location information. To minimize network traffic local landmark nodes may be strategically placed in the network, such as near gateway routers. For example, routers encountered by a message being routed from the node to a global landmark can be used as local landmark nodes.

Figure 2:
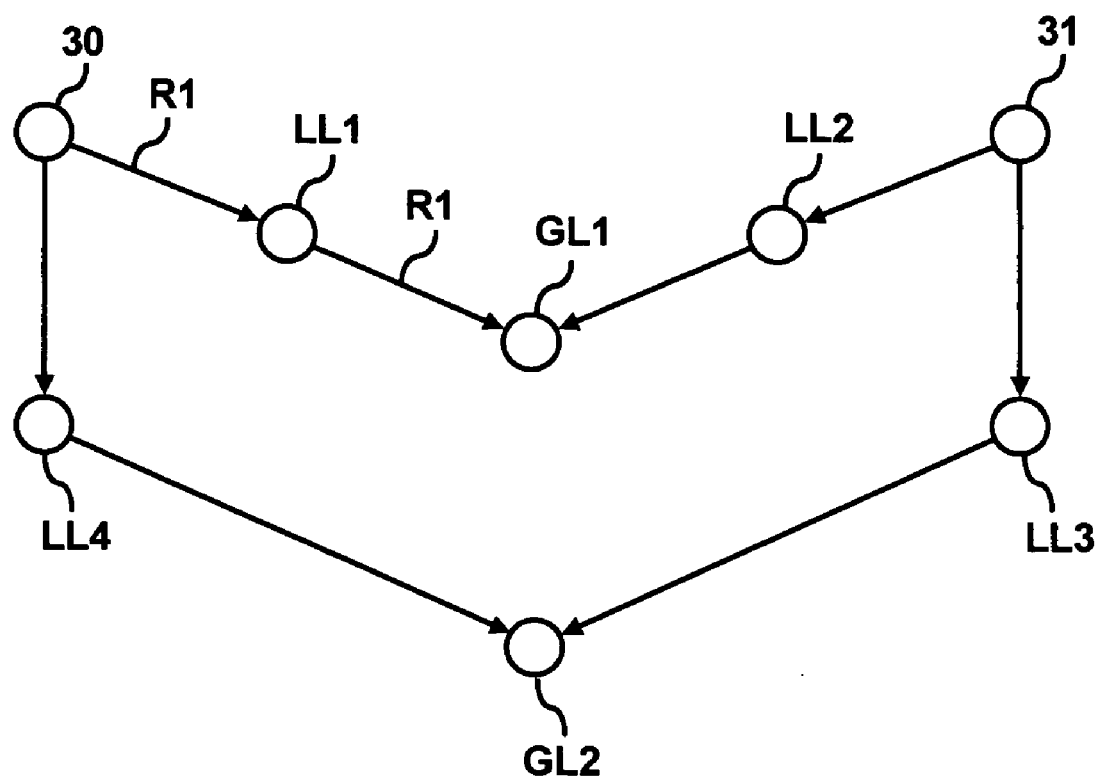
FIG. 2 illustrates determining location information for nodes in the network shown in FIG. 1, according to an embodiment.

FIG. 2 illustrates an example of using global landmark nodes and local landmark nodes in the network to generate location information. Location information is generated for the nodes 30 and 31 in the network 100 by measuring distance to global landmark nodes and local landmark nodes. In one example, distances may be measured to substantially every global landmark node in the network 100 and to local landmark nodes in proximity to the node 30. For example, for node 30 distances are measured to the global landmarks GL1 and GL2. Distances are also measured to the local landmark nodes LL1 and LL2. Distance to a node may be measured using a known network metric, such as round-trip-time (RTT) or network hops. For example, the node 30 may transmit a probe packet to the global landmark node GL1 and measure RTT of the probe packet to determine the distance to the global landmark node GL1. A probe packet, for example, is a packet generated by node to measure one or more predetermined network metrics, such as RTT.

A landmark vector representing the location information for the node 30 is generated including the distances to the global landmark nodes GL1 and GL2 and the local landmark nodes LL1 and LL4. The landmark vector for the node 10 may be represented as <d(n, GL1), d(n, LL1), d(n, GL2), d(n, LL4)>, where d is the distance between the nodes and n represents the node for which location information is being generated.

Similarly, location information may be generated for the node 31. For example, distances are measured to the global landmarks GL1 and GL2. Distances are also measured to the local landmark nodes LL2 and LL3. A landmark vector representing the location information for the node 31 is generated including the distances to the global landmark nodes GL1 and GL2 and the local landmark nodes LL2 and LL3. The landmark vector for the node 20 may be represented as <d(n, GL1), d(n, LL2), d(n, GL2), d(n, LL3)>.

A location estimation technique that only considers distance to the global landmarks GL1 and GL2 may conclude that nodes 30 and 31 are in close proximity in the network 100, because the nodes 30 and 31 have similar distances to the global landmark nodes GL1 and GL2. These types of inaccuracies are known as false clustering. By accounting for the distances to the local landmark nodes LL1-LL4, false clustering is minimized and a more accurate estimation of the physical location of the nodes 30 and 31 is determined.

The network 100 may include many local landmark nodes and global landmark nodes, not shown. Any of the service nodes, source nodes, and user nodes shown in FIG. 1 may be used as local or global landmark nodes. The number of nodes selected to be local landmark nodes and global landmark nodes is generally much smaller than the total number of nodes in the network. Also, the total number of global landmark nodes in the network 100 is generally smaller than the number of local landmark nodes. The number of global and local landmark nodes used in the network 100 may depend on the desired accuracy of the location information. Simulations have shown that a relatively small number of global landmarks are needed, for example, 15 global landmark nodes for a network of 10,000 nodes, to generate accurate location information. Almost any node in the network 100 may be chosen to be a global landmark node or a local landmark node. For example, a predetermined number of nodes in the network may be randomly selected to be global landmark nodes and local landmark nodes, whereby the number of global landmark nodes is smaller than the number of local landmark nodes. To minimize network traffic local landmark nodes may be strategically placed in the network 100, such as near gateway routers. For example, nodes near gateway routers may be selected to be local landmark nodes.

As described above, the nodes 30 and 31 measure distance to local landmark nodes proximally located to the nodes 30 and 31. In one embodiment, local landmark nodes are proximally located to a node if the local landmark nodes are on a routing path to a global node. For example, node 30 transmits a probe packet to the global landmark node GL1. The probe packet encounters local landmark node LL1, because it is on the routing path R1 to the global landmark node GL1. The local landmark node LL1 transmits an acknowledge (ACK) message back to the node 10. The node 30 determines distance to the local landmark node LL1, for example, using the RTT of the probe packet and the ACK message. Also, to minimize network traffic, a probe packet may keep track of the number of local landmark nodes that it has encountered, for example, by updating a field in a packet header similar to a time-to-live field. If a local landmark node receives a probe packet that has already encountered a predetermined number of local landmark nodes, the local landmark node simply forwards the packet without transmitting an ACK message.

In another embodiment, each of the local landmark nodes measures its distance to global landmark nodes to obtain its own landmark vector. These landmark vectors are stored in a global information table that is stored in the nodes in the network 100. The global information table is queried to identify local landmark nodes in proximity to a node. For example, the node 30 queries the global information table to identify local landmark nodes, such as the local landmark nodes LL1 and LL4, in proximity with the node 10. This may include identifying local landmark nodes having landmark vectors with a predetermined similarity to the node 10, wherein the predetermined similarity is related to a distance threshold between the node and the landmark node. Then, the node 30 determines distance to the local landmark nodes LL1 and LL4. Thus, a local landmark node need not be in a routing path to a global landmark node to be considered proximally located to the node 10.

Each node in the network 100 may generate location information, such as landmark vectors, by determining distances to the global landmark nodes and proximally located local landmark nodes. Each node stores its location information in a global information table. Thus, the global information table may include landmark vectors for substantially all the nodes in the network.

The global information table is stored in a distributed hash table (DHT) overlay network. DHT overlay networks are logical representations of an underlying physical network, such as the network 100, which provide, among other types of functionality, data placement, information retrieval, and routing. A DHT overlay network provides a hash table abstraction that maps keys to values. For example, data is represented in an overlay network as a (key, value) pair, such as (K1,V1). K1 is deterministically mapped to a point P in the overlay network using a hash function, e.g., P=h(K1). An example of a hash function is checksum or a space filling curve when hashing to spaces of different dimensions. The key value pair (K1, V1) is then stored at the point P in the overlay network, i.e., at the node owning the zone where point P lies. The same hash function is used to retrieve data, and this hash function is used by all the nodes in the DHT overlay network. For example, the hash function is used to calculate the point P from K1. Then the data is retrieved from the point P.

In one example, the global information table is stored in a CAN overlay network, however other types of DHT overlay networks may be used. In this example, a landmark vector or a portion of the landmark vector for a node is used as a key to identify a location in the DHT overlay network for storing information about the node. By using the landmark vector as a key, information about nodes physically close to each other in the underlying physical network are stored close to each other in the DHT overlay network, resulting in a minimal amount of traffic being generated when identifying a set of nodes close to a given node in the network.

Figure 3:
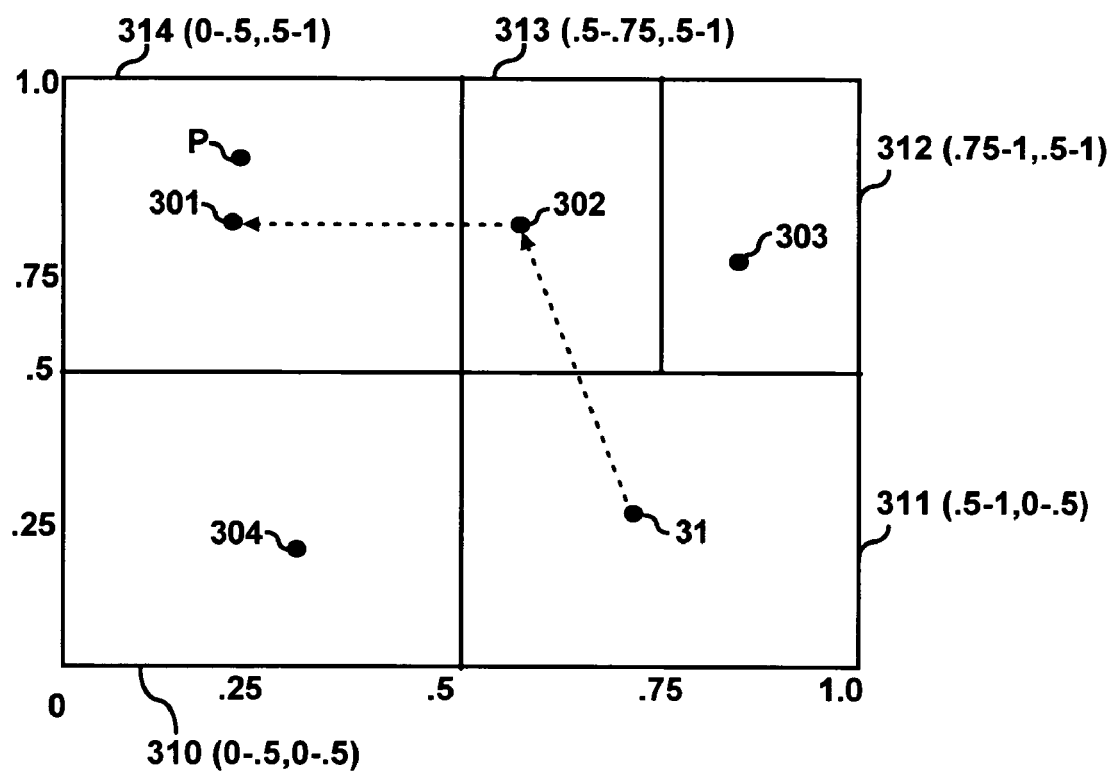
FIG. 3 illustrates a 2-dimensional CAN overlay network for the network shown in FIG. 1, according to an embodiment.

FIG. 3 illustrates an example of a 2-dimensional CAN overlay network 300, which is a logical representation of the underlying physical network 100. The nodes 301-304 shown in FIG. 3 are not shown in the network 100 shown in FIG. 1, but the nodes 301-304 may also be in the network 100. A CAN overlay network logically represents the underlying physical network using a d-dimensional Cartesian coordinate space on a d-torus. FIG. 3 illustrates a 2-dimensional [0,1]×[0,1] Cartesian coordinate space in the overlay network 300. The coordinates for the zones 310-314 are shown. The Cartesian space is partitioned into CAN zones 310-314 owned by nodes 301-304 and 31, respectively. Each DHT node in the overlay network owns a zone. The nodes 302, 303 and 304 are neighbor nodes to the node 31 and the nodes 301 and 31 are neighbor nodes to the node 304. Two nodes are neighbors if their zones overlap along d-1 dimensions and abut along one dimension. For example, the zones 310 and 314 abut along [0, 0.5]×[0.5,0]. The zones 310 and 313 are not neighbor zones because these zones do not abut along a dimension.

The nodes 301-304 and 31 each maintain a coordinate routing table that may include the IP address and the zone coordinates in the overlay network of each of its immediate neighbors. The routing table is used for routing from a source node to a destination node through neighboring nodes in the DHT overlay network 300.

Assume the node 31 is transmitting a request for data, such as data from the global information table stored at the node 301, from a point P in the zone 314 owned by the node 301. Because the point P is not in the zone 31 or any of the neighboring zones of the zone 311, the request for data is routed through a neighboring zone, such as the zone 313 owned by the node 302 to the node 301 owning the zone 314 where point P lies. Thus, a CAN message includes destination coordinates, such as the coordinates for the point P determined using the hash function, for routing. The overlay network shown in FIG. 3 may be a portion of the overlay network 300. The overlay network 300 may include thousands of DHT nodes forming the overlay network. Also, the number of dimensions of the overlay network may be much larger than 2 dimensions.

The global information table includes information about the nodes in the network 100, and the information is stored in the nodes in the DHT overlay network 300. To store information about a node in the global information table, the landmark vector for the node, which includes distances to the global landmark nodes in the network and distances to proximally located local landmark nodes, is used as a key to identify a location in the DHT overlay network for storing information about the node. By using the landmark vector or a portion of the landmark vector, such as the distances to the global landmark nodes, as a key, information about nodes physically close to each other in the network are stored close to each other in the DHT overlay network.

Figure 4:
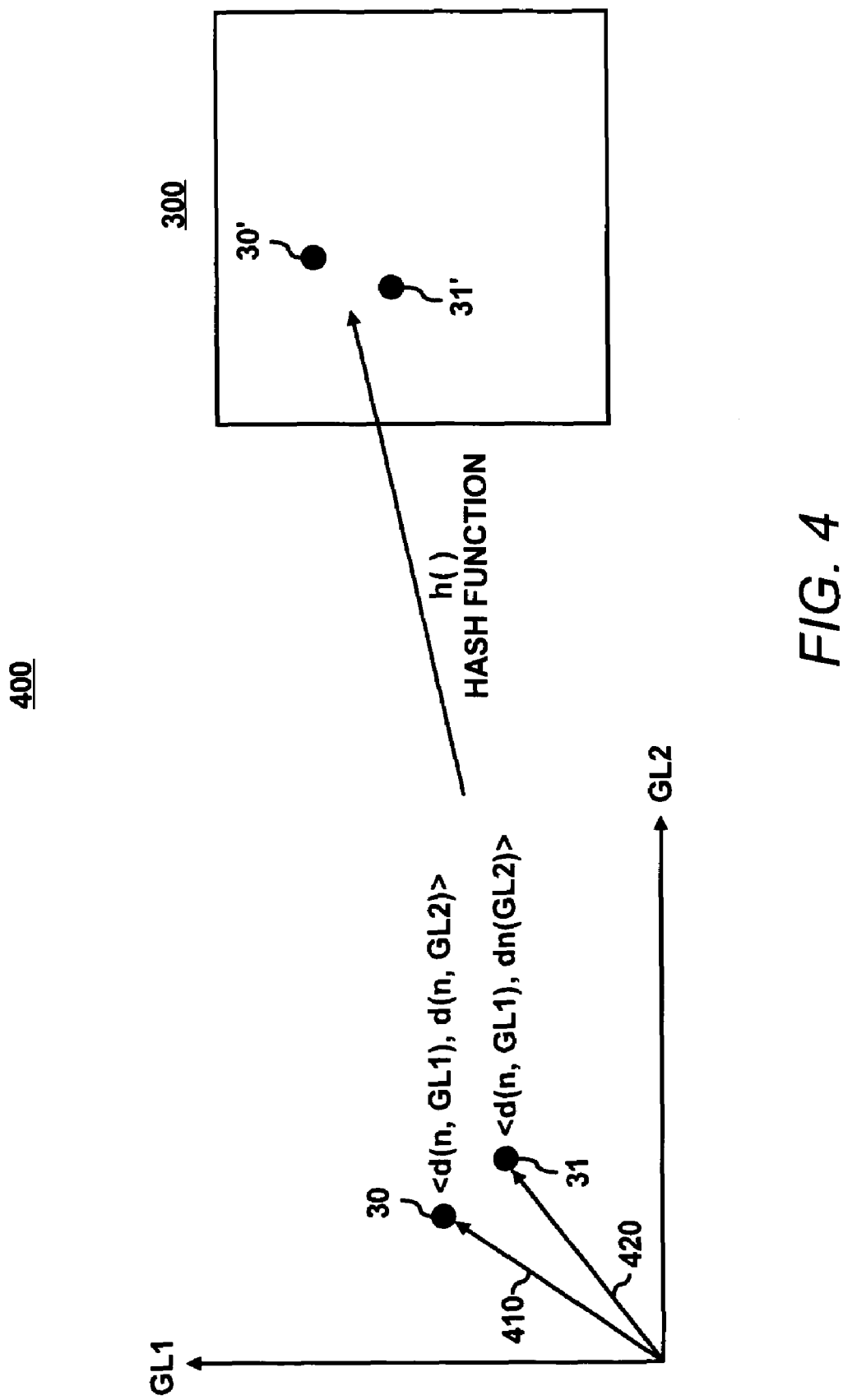
FIG. 4 illustrates using a hash function to translate points in a landmark space to the overlay network shown in FIG. 3, according to an embodiment.

FIG. 4 illustrates mapping points from a landmark space 400, including landmark vectors 410 and 420 for the nodes 30 and 31, to the CAN DHT overlay network 300. The landmark space 400 is a logical representation of a space for mapping the landmark vectors of the nodes in the network 100. The landmark space 400 is being shown to illustrate the mapping of the landmark vectors to locations in the DHT overlay network 300 for storing information in the global information table.

The global landmark portions of the landmark vectors for the nodes 30 and 31 are used to identify points in the landmark space 400 that are mapped to the DHT overlay network 100 for storing information in the global information table. The global landmark portion for the nodes 30 and 31 is <d(n, GL1), d(n, GL2))>, where d is distance to the global landmark nodes and n is the node 30 or 31. Each node in the network 100 may be mapped to the landmark space 400 using the global landmark portion of the respective landmark vector. Also, the landmark space 400 may be much greater than two dimensions. The number of dimensions may be equal to the number of global landmark nodes used in the network 100. The nodes 30 and 31 are positioned in the landmark space 400 at coordinates based on their landmark vectors. Thus, nodes close to each other in the landmark space 400 are close in the physical network 100.

A hash function is used to translate physical node location information (e.g., landmark vectors or global portion of the landmark vectors) from the landmark space 400 to the DHT overlay network 300, such that points close in the landmark space 400 are mapped to points that are close in the DHT overlay network 300. FIG. 4 illustrates using a hash function to translate the points for the nodes 30 and 31 in the landmark space 400 to the overlay network 300. The hash function is used to determine the points 30' and 31' in the overlay network 300 that correspond to the points in the landmark space 400 for the nodes 30 and 31. The information for the nodes 30 and 31 is stored in the nodes that own the zone where the points 30' and 31' are located. Thus, by hashing the global landmark portion of a landmark vector, a node in the overlay network 300 is identified for storing information in the global information table, such as the complete landmark vector for the node 30, the services provided by the node 30 if any, and possibly QoS characteristics associated with the node and the services. Thus, the global information table is stored among the nodes in the DHT overlay network 300, such that a global information table stored at a node in the DHT overlay network includes information about nodes physical close in the underlying physical network 100.

It should be noted that the location in the DHT overlay network for storing information in the global information table about a given node may not be the same location of the given node in the DHT overlay network. For example, referring to FIG. 3, the node 31 is located in the DHT overlay network 300 in zone 311. Hashing the global portion of the landmark vector of the node 31 may identify a location in the zone 314 owned by the node 301. Thus, information for the node 30 is stored in the global information table at the node 301.

Using a DHT overlay network to store landmark vectors is further described in U.S. patent application Ser. No. 10/666, 621, entitled "Utilizing Proximity Information In An Overlay Network" by Tang et al., having a common assignee with the present application, which is hereby incorporated by reference in its entirety. In certain instances, the number of dimensions of the landmark space may be larger than the number of dimensions of the overlay network. A hash function comprising a space filling curve may be used to map points from the larger dimension space to the smaller dimension space, which is also described in the aforementioned patent application, U.S. patent application Ser. No. 10/666,621, incorporated by reference.

3. Multicast Tree Construction

The network 100 shown in FIG. 1 is operable to deliver personalized services that meet the individual needs of users while keeping the structure of multicast trees in the network 100 efficient. To meet these criteria, service path expressions specifying requested services and service requirements (e.g., QoS characteristics) are used to identify personalized services requested by a user. Then, a tree construction algorithm attempts to satisfy the user's request by reusing existing service paths or augmenting existing service paths. To maximize efficiency in terms of network resource utilization, the tree construction algorithm uses information in the global information table to identify the closest nodes that are operable to provide the services and service requirements specified in the request. Also, the following three heuristics are utilized: to the extent possible, service paths are reused; to the extent possible, new service paths are created from existing service paths; and a new service component, such as service node newly added to the network to provide a requested service, should be as near as possible to a node requesting the service.

Service paths in the network 100 are built starting from service path expressions. A service path expression specifies a list of requested services and the order of applying the services. The order in which the services are applied may be significant. For example, typically a transcoding service needs to be applied before an encryption service. An example of a service path expression is as follows. Assume f and g represent an encryption service and a transcoding service respectively. The user node 31 in the network 100 shown in FIG. 1 is requesting the encryption and transcoding services. A service path expression f(g(O)) is generated at the user node 31 and transmitted to the DHT overlay network to search for the requested services. In the service path expression f(g(O)), g(O) represents that the transcoding service should be applied to the source content, such as provided by the source node 10, first. Then, the encryption service should be applied to the output of the transcoding service.

The service path expression may also include service requirements. A service requirement is a QoS characteristic that affects the application and/or delivery of a service. Examples of QoS characteristics associated with a service node are storage capacity, computing capacity, load, etc. Examples of QoS characteristics associated with a service path are delay to the root, bottleneck bandwidth, number of service nodes in a service path, node IDs of nodes in a path to the root, etc. Examples of service requirements in a service path expression are delay <100 ms and bandwidth> 100 kbs. The user can specify preferences by placing more preferable service requirements earlier in the service path expression if multiple service requirements are provided. Thus, even if less preferable service requirements cannot be met by a particular service path, that service path may be selected to deliver the service if it is the most optimum selection among available service paths. As described above, the service path expression may include a list of requested of services and service requirements. An example of a service path expression including a list of requested of services and service requirements is {f(g (O)): delay <100 ms; bandwidth >100 kbs}.

When a node wants to join a multicast tree to receive one or more services, the node computes its landmark vector and submits its request, including the service path expression, to the DHT overlay network. For example, assume node 31 shown in FIG. 1 desires to receive encryption and transcoding services for the content from the source node 10. The node 31 determines its landmark vector by measuring distances to global landmark nodes and proximally located local landmark nodes in the network 100. The node 31 hashes the global portion of its landmark vector to identify a node in the DHT overlay network for transmitting the request, including the service path expression. The request is routed to that node, e.g., the node 301 shown in FIG. 3.

The DHT overlay network selects a set of candidate nodes closest to the node 31 that can satisfy the request. For example, the node 301 searches the global information table to identify a set of candidate nodes closest to the node 31 that are operable to provide the requested services within the service requirements specified in the service path expression in the request. Searching the global information table may include searching the global information table stored at the node 31 and its neighbor nodes. Information for nodes close to the node 31 is stored at the node 301 or its neighbor nodes, because information for nodes physically close in the network 100 is stored close in the DHT overlay network 300 by hashing landmark vectors, such as described above.

When searching the global information table, the node 301 identifies service nodes that are able to provide the requested service within the requested service requirements. Assume f and g represent an encryption service and a transcoding service requested by the node 31, and O represents the content from the source node 10. The service path expression includes f(g(O)). The node 301 searches the global information table to determine whether a close-by service path for f(g(O)) is available. If the service path is available, such as the service path 51 shown in FIG. 1, then the node 31 connects to the service node 22 as a child to receive the requested services.

If no existing service path matches the request, then the node 301 searches the global information table to find a set of candidate nodes close to the node 30 that can provide the services f and a set of candidate nodes that can provide the service g(O). For example, the node 301 compares the global landmark portion of the landmark vector of the node 31 to the global landmark portions of the landmark vectors for the service nodes that can provide the requested service. One measure of similarity between the landmark vectors or the global portions of the landmark vectors is the cosine of the angle between two landmark vectors. Landmark vectors that are the most similar to the landmark vector of the node 31 may be selected as a candidate node. The number of candidate nodes selected may be based on the desired accuracy for finding the closest node. From the comparison of landmark vectors or global portions of the landmark vectors, a set of candidate nodes is selected that are closest to the node 31.

If an existing service path for a requested service is available, then the node 301 searches for a service node close to the node 31 that can provide the remaining service. For example, if the service path for g(O) exists, then the node 301 searches for a service node close to the node 31, such as the service node 21, that can provide the service f.

In certain cases, a current service may need to be undone to provide the desirable service. For instance, if the service path $f^1(g(O))$ is available, where $f^1$ represents a reversible de-encryption service, then the node providing the reversible service is requested to provide the service f instead of $f^1$. Then, that service path is used.

If a set of candidate nodes are identified by the node 301 that can provide the requested service, the node 301 uses the complete landmark vectors of all the candidate nodes and the complete landmark vector of the node 31 to apply a clustering algorithm to identify a subset of the set of candidate nodes that are closest to the node 31. A clustering algorithm is any algorithm that may be used to identify a subset of values from an initial set of values based on predetermined characteristics, such as similarities between location information. Four examples of clustering algorithms, described below by way of example and not limitation, are min_sum, max_diff, order, and inner product.

The min_sum clustering algorithm assumes that if there are a sufficient number of landmark nodes, global and local, that two nodes n and c measure distances against, it is likely one of the landmark nodes, L, is located on a shortest path between the two nodes n and c, where n is a given node, such as the node 31, and c is a node in the initial set of candidate nodes determined to be close to the node 31. An example of the node L is the global landmark node GL1, shown in FIG. 2, located on the shortest path between the nodes 30 and 31.

For min_sum, the sum of dist(n, L) and dist(c, L) should be minimal. For the node n and its initial set of candidate nodes, represented as C, min_sum (n, C) is formally defined using equation 1 as follows:

$$\min_{c \in C; L \in L(n,c)}(\text{dist}(n, L) + \text{dist}(c, L)). \quad \text{Equation (1)}$$

In equation 1, C is the set of candidate nodes, c is an element of the set C, and L(n, c) is the common set of landmark nodes, global and local, that the nodes n and c have measured against. Using equation 1, nodes from the candidate nodes C are selected for the subset of top candidates closest to the node n if they have the smallest distance sums for dist(n, L)+dist(c, L). Similarly, the assumption behind max_diff is that if there are sufficient number of landmark nodes, global and local, that both n and c measure distances against, then there is a large likelihood that there exists a landmark node L such that c is on the shortest path from n to L or n is on the shortest path between c and L. In that case the ABS(dist(n, L)−dist(c, L)) may be used to identify a subset of the candidate nodes closest to the node n. The function ABS (x) returns the absolute value of x. Max_diff(n, C) is formally defined using equation 2 as follows:

$$\max_{c \in C: L \in L(n,c)} ABS(dist(n, L) - dist(c, L)). \quad \text{Equation (2)}$$

For order, which is another example of a clustering algorithm, an assumption is made that if two nodes have similar distances to a set of common nodes, then the two nodes are likely to be close to each other. Using the order clustering algorithm, a node measures its RTT to the global landmark nodes and sorts the global landmark nodes in increasing RTTs. Therefore, each node has an associated order of global landmark nodes. Nodes with the same or similar order of global landmark nodes are considered to be close to each other. This technique however, cannot differentiate between nodes with the same global landmark orders, and thus is prone to false clustering.

For the nodes n, c, and L, where L is an element of the set of landmark nodes, global or local, that is common to the landmark vectors of nodes n and c, represented as L∈L(n, c), the order of global landmarks in the landmark vector for the node n is defined as the order of global landmark nodes in the sorted list of all nodes L(n, c) based on their distances to the node n. The order of global landmark nodes is similarly defined. Thus, the order(n, c) is defined in equation 3 as follows:

$$\min \Sigma_{L \in L(n,c)} ABS(order(L)n - order(L)c). \quad \text{Equation (3)}$$

The clustering algorithm inner_product assumes that if a landmark node is close to a node n, then that landmark node can give a better indication of the location of the node n in the network. For example, the landmark vector for the node 31 may be represented as <d(n, GL1), d(n, LL1), d(n, GL2), d(n, LL4)>, where d is the distance between the nodes and n represents the node 31. If d(n, LL1) is shorter than d(n, LL4), then d(n, LL1) is given more weight by the inner_product clustering algorithm when comparing landmark vectors for the node 31 and the landmark vectors for the candidate nodes. The inner_product (n, c) is defined in equation 4 as follows:

$$\max \Sigma_{L \in L(n,c)} ((1.0/(dist(n, L)^2)) \times ((1.0/(dist(c, L)^2))). \quad \text{Equation (4)}$$

The landmark clustering algorithms described above are examples of algorithms that may be used to identify a subset of the initial set of candidate nodes that are closest to a node n. Other known clustering algorithms, such as k-means, principal component analysis, and latent semantic indexing, may be used to select the subset of candidate nodes.

After the subset of candidate nodes are identified, a list of the subset of candidate nodes is transmitted to the node 31. The node 31 performs some additional measurements and selects a service node from the subset that can satisfy the request and maintain a reasonably efficient multicast tree. For example, the node 31 measures distance to each of the subset of candidate nodes. The node 31 may also measure for service path requirements, such as delay and bandwidth between node 31 and the subset of candidate nodes. A service node, such as the service node 22 shown in FIG. 1, from the subset of candidate nodes is selected that is closest to the node 31 and that can meet the requested service path requirements. If nodes for two services, such as the services f and g, are being selected, then the node 31 performs measurements to each subset of candidate nodes returned by the node 301 for selecting service nodes providing the services f and g.

Service paths are constructed to the selected service nodes. This may include either reusing an existing service path by attaching to a node as its child or constructing a new service path by adding connections between multiple nodes.

4. Multicast Tree Reconfiguration

In one embodiment, a multicast tree reconfiguration is performed based on a degradation of QoS perceived at a node. Perceived QoS may be measured by a client application at a node. Perceived QoS may include measuring predetermined QoS characteristics and determining whether the QoS characteristics fall below a threshold. QoS characteristics include metrics related to a routing path or node in a multicast tree delivering a service, such as storage capacity, computing capacity, load, delay to the root, bottleneck bandwidth, and number of service nodes in a service path. If the QoS characteristics fall below a threshold, then the node generates a reconfiguration request. Also, a user using the node may perceive degradation in quality, such as periodic pauses in received streaming video or music. User input, such as pressing a key on a keyboard or clicking a mouse, may be used to initiate a reconfiguration.

When a degradation of QoS is detected, the node requests a multicast tree reconfiguration. Also, a location of a problematic link in the multicast tree is determined. For example, referring to FIG. 1, assume the user node 31 perceives a degradation of QoS, the user node 31 transmits a complaint to its parent node in the multicast tree 110, which is the service node 22. The complaint is a message indicating that there is a problem with the received services at the user node 31 and may also include the landmark vector for the user node 31. If the service node 22 does not perceive degradation in QoS, then the service node 22 assumes there is a problem in the link between the service node 22 and the user node 31. The service node 22 transmits the complaint to the DHT overlay network 300. For example, the service node 22 hashes the landmark vector or the global portion of the landmark vector for the user node 31, and transmits the complaint to the node in the DHT overlay network 300, such as the node 301 shown in FIG. 3, identified by hashing the landmark vector of the user node 31. Similarly to constructing a service path described above, the node 301 selects a set of candidate nodes operable to satisfy the service requirements of the user node 31 from the global information table. This may include selecting an initial set of nodes and applying a clustering algorithm to identify a set of candidate nodes from the initial set of nodes. The candidate nodes are physically close to the user node 31.

When selecting candidate nodes, the DHT overlay network avoids a cyclic path (i.e., looping) by selecting nodes that have recently transmitted a complaint. For example, the global information table stores node IDs of nodes that have transmitted a complaint. The node 301 is selecting candidate nodes for the user node 31. The node 301 does not select a complaining node to be a candidate node if the complaining node is in the service path from the root to the user node 31.

The user node 31 measures distances and QoS characteristics for each of the candidate nodes, and selects the optimal candidate node as its parent node to receive its services therefrom. For example, the user node 31 may select service node 20 if it is the closest service node that satisfies the service requirements, such as providing the required services and QoS characteristics, of the user node 31. Then, a new service path is created including the service node 20 and the user node 31.

If the service node 22 also perceives degradation in QoS, then the service node 22 assumes the problem is upstream from the service node 22. The service node 22 suppresses the complaint from the user node 31. The complaint from the user node 31 may timeout, and then the user node 31 may retransmit to the complaint to the service node 22. After a predetermined number of timeouts, the user node 31 may select a new service node by transmitting a request for services to the DHT overlay network, such as described above.

If the service node 22 also perceives degradation in QoS, the service node 22 transmits a complaint to its parent node, such as the service node 21, along with its landmark vector. The service node 22 may have transmitted a complaint to the service node 21 before receiving the complaint from the user node 31 if the service node detected degradation in QoS prior to receiving the complaint from the user node 31.

The service node 21 submits the complaint to the DHT overlay network if the service node 21 does not perceive degradation in QoS. The DHT overlay network sends a set of candidate nodes to the service node 22, and the service node 22 selects one of the candidate nodes. A new service path is created including the newly selected node, the service node 22, and the user node 31. Thus, this process of identifying the location of a problematic link in a service path is repeated until a parent node upstream does not perceive degradation in QoS. Then, the child node incident to the problematic link, such as the service node 22, selects a new parent, instead of having every node downstream of the child node finding a new parent. For example, instead of both the user node 31 and the service node 22 each selecting a new parent node, only the service node 22 may select a new parent node.

If a link between a node and the source node is problematic, such as the link between the service node 21 and the source node 10, then the service node 21 submits the landmark vectors and complaints for the service node 22 and the user node 30 to the DHT overlay network. The service node 22 and the user node 30 select new parent nodes and new service paths are created.

In another example, a multicast tree reconfiguration is performed on a demand-driven basis. Multicast tree reconfigurations are performed in response to predetermined conditions occurring. The predetermined conditions invoking a tree reconfiguration can be specified in the global information table for each node as reconfiguration state information. For example, reconfiguration state information for the user node 31 shown in FIG. 1 may include notify when a new node or service path within a predetermined distance is available having a delay <20 ms and providing the requested services. Also, the predetermined conditions may be global and need not be specified for each node in the global information table. For example, the DHT overlay network may evaluate a multicast tree whenever a node joins or leaves the network. The evaluation may be performed for nodes within a predetermined distance to the node leaving or joining the network.

An example of demand-driven multicast tree reconfiguration is as follows. Referring to FIG. 1, assume that when the user node 31 joined the network 100, the service node 22 was the closest node to the user node 31 that satisfied the service requirements of the user node 31. The DHT overlay network evaluates the profiles of the nodes in the network 100 as nodes join and leave the network 100. If the service node 20 newly joins the network 100 and the service node 22 is operable to satisfy the service requirements of the user node 31, the DHT overlay network notifies the user node 31 that the service node 20 is available and satisfies the service requirements of the user node 31. The user node 31 measures distance to the service node 20 and determines QoS characteristics for the service node 20, such as delay in the link. The user node 31 decides whether to reconstruct the multicast tree 110 based on its measurements. For example, if the service node is closer or provides better QoS than the service node 22, then a service path is constructed to the service node 20.

Switching to a new parent, such as during a multicast tree reconfiguration, may cause delays in service. This can result in perceived QoS degradation for various types of services, such as multimedia applications and transcoding. To minimize disruption of service, multi-homing is performed at the multicast overlay layer during the hand-off period when switching to a new parent. For example, during handoff, the child maintains its connection with the old parent while establishing a connection with the new parent. Thus, the child receives application packets for the service from both parents until the handoff is complete. The connection to the old parent may be terminated after packets received from the old parent and the new parent are synchronized.

Figure 5:
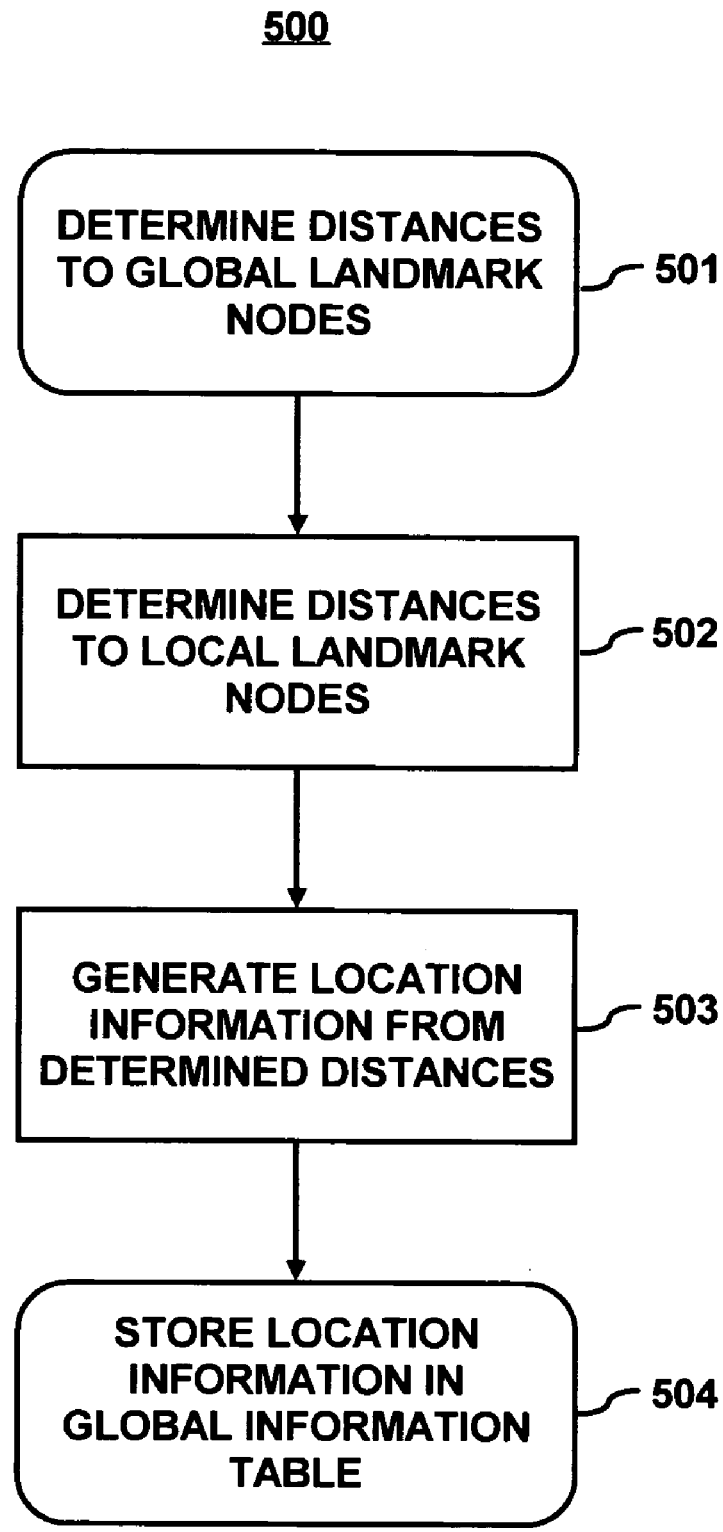
FIG. 5 illustrates a flow chart of a method for determining location information for a node in a network, according to an embodiment.

FIG. 5 illustrates a flow chart of a method for determining location information for nodes, according to an embodiment. FIG. 5 is described with respect to the network 100 shown in FIGS. 1 and 2 and the overlay network 300 shown in FIGS. 3 and 4 by way of example and not limitation. At step 501, the node 31 determines distances to the global landmark nodes in the network 100. For example, the node 31 measures distances to the global landmark nodes GL1 and GL2, shown in FIG. 3, using RTT or another network metric.

At step 502, the node 31 determines distances to local landmark nodes in proximity to the node 31. This may include the local landmark nodes LL2 and LL3, shown in FIG. 3, encountered by a probe packet measuring RTTs to the global landmark nodes GL1 and GL2. In another example, distances to all local landmark nodes within a predetermined distance to the node are determined using the global information table. This may be determined by comparing landmark vectors for nodes. Nodes with landmark vectors having a predetermined similarity are selected from the global information table.

Steps 501 and 502 may be performed together. For example, when the local landmark nodes reside on the routing path, probing the global landmark node gets the distances to the corresponding local landmarks with substantially no messaging overhead. For example, substantially all the routers in the network may be selected as local landmark nodes and traceroute or another similar network utility is used to obtain the distances to global and local landmark nodes. In this example, distance to every router in a routing path between a node and a global landmark node may not be measured. For example, a time-to-live field may be utilized, such that distances to only the first predetermined number of routers receiving the probe packet are measured. Alternatively, distances to, for example, the $1^{st}$, $2^{nd}$, $4^{th}$, $8^{th}$, and $16^{th}$ routers are measured. Thus, distances to a number of routers less than the total number of routers on a routing path to a global landmark node may be measured.

At step 503, location information for the node 31 is generated using the distances to the global landmark nodes and the local landmark nodes. For example, a landmark vector is generated for the node 31, shown in FIG. 4 as vector 420, including the distances to the global landmark nodes GL1 and GL2 and the distances to the local landmark nodes LL2 and LL3.

At step 504, the node 31 stores its location information, such as its landmark vector, in the global information table. In one example, this includes hashing the global landmark portion of the landmark vector to identify a location in the DHT overlay network 300, shown in FIGS. 3 and 4, for storing the location information and possibly other information about the node 31. The other information may include QoS characteristics, such as information about node metrics and service path metrics, node ID, and services provided, such as shown in Table 1.

Figure 6:
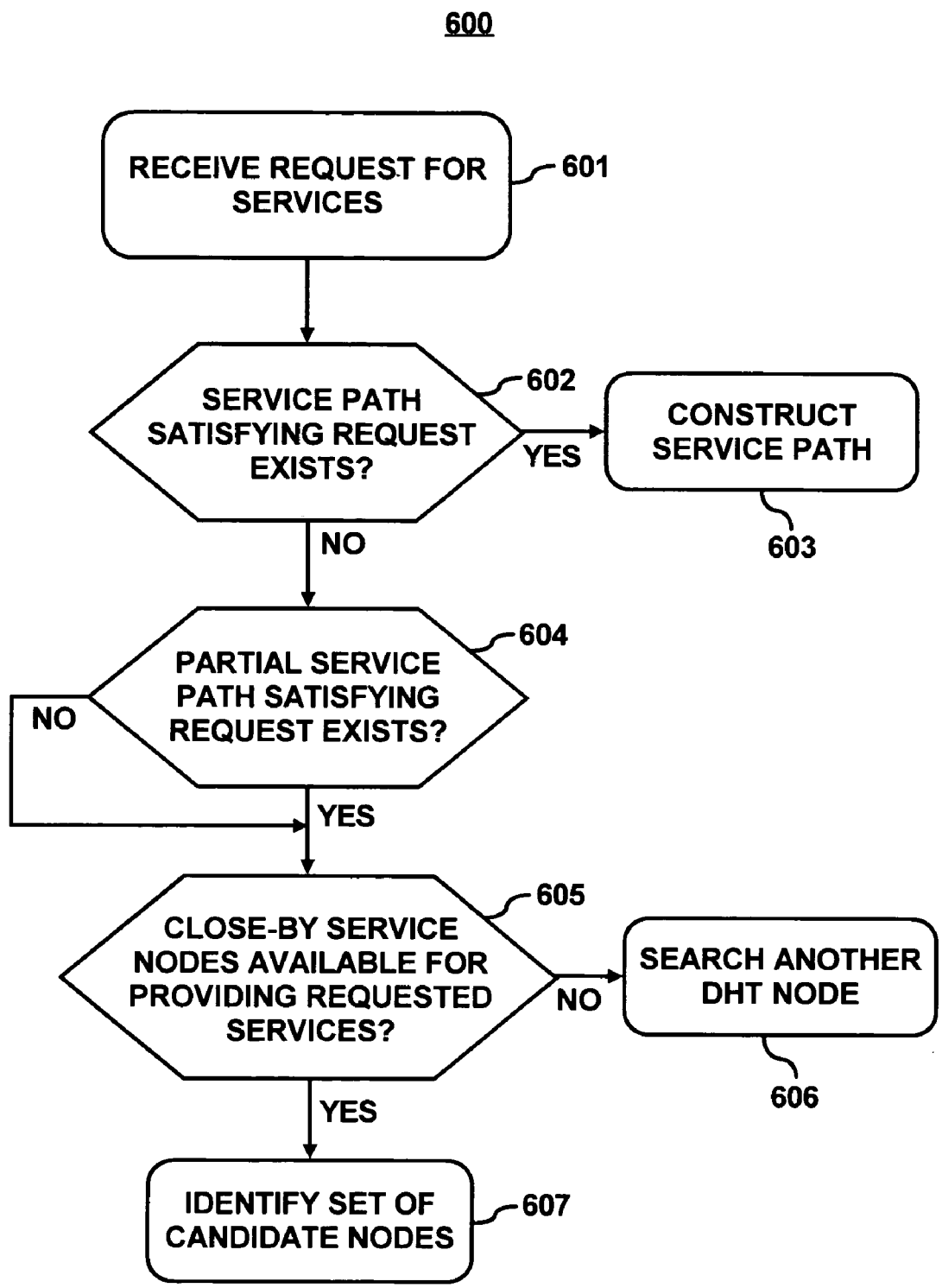
FIG. 6 illustrates a flow chart of a method for selecting nodes or a service path satisfying a request for services, according to an embodiment.

FIG. 6 illustrates a flow chart of a method 600 for identifying service nodes and/or a service path for providing requested services according to an embodiment. FIG. 6 is described with respect to the network 100 shown in FIGS. 1 and 2 and the overlay network 300 shown in FIGS. 3 and 4 by way of example and not limitation. At step 601, a node in the DHT overlay network, such as the node 301 shown in FIG. 3, receives a request for services. For example, the node 31 transmits a request for services to the DHT overlay network 300 shown in FIG. 3. This may include the node 31 hashing the global portion of its landmark vector to identify a point in the DHT overlay network 300. The node 31 transmits the request to a node, such as the node 301, in the DHT overlay network 300 owning the zone where the identified point is located. The request includes a service path expression identifying one or more requested services and service requirements, if any.

At steps 602-606, the node 301 searches the global information table for service paths or service nodes that satisfy the request. Searching the global information table may include searching the global information table stored in the node 301 and in surrounding nodes, which may include neighbor nodes and possibly neighbor nodes to the neighbor nodes. At step 602, the node 301 searches the global information table for a service path that satisfies the request for services. For example, if the request for services includes transcoding and encryption, the node 301 searches the global information table for a service path including transcoding and encryption in that order. If the service path exists, then a service path to the node 31 is constructed at step 603. For example, the node 31 transmits a request to join the tree 110 as a child to the service node 22.

At step 604, if the service path does not exist, the node 301 searches for a partial service path, such as a service path transcoding the content from the source node 10. If a partial service path exists, then at steps 605 and 607 the node 301 searches for a set of candidate nodes physically close to the node 31 that provides the remaining service. If, at step 604, a partial service path is not available, then the node 301 searches the global information table, at steps 605 and 607, for a set of candidate nodes physically close to the node 31 that can provide the transcoding service and a set of candidate nodes physically close to the node 31 that can provide the encryption service.

At steps 605 and 607, if the node 301 identifies a plurality of service nodes from the global information table that can provide the requested service, the node 301 applies a clustering algorithm to the identified nodes to select a set of candidate nodes from the plurality of nodes that are closest to the node 31. A list of the set of candidate nodes, including their landmark vectors, is transmitted to the node 31. The node 31, selects one of the candidate nodes to be included in the service path for receiving the requested services, for example, by performing distance and QoS measurements to each of the candidate nodes.

At step 606, if the node 301 searching the global information table cannot find a service node that can provide the requested service, then the node 301 transmits a message to the node 31 indicating that the service node providing the requesting service cannot be found. The node 31 then transmits a request for services to another DHT node. For example, the node 31 may hash the landmark vectors for other nodes in its routing table to identify another DHT node for transmitting the request for services. That DHT node then searches its global information table for service paths or service nodes satisfying the request.

At steps 602 and 604, the node 301 may attempt to identify from the global information table an existing service path or a partial existing service path that is within a predetermined distance to the node 31. Similarly, at step 605, the node 301 may attempt to identify from the global information table one or more candidate nodes that are within a predetermined distance to the node 31. Landmark vectors may be compared to determine whether a node is within a predetermined distance to another node. One measure of similarity between the landmark vectors or the global portions of the landmark vectors is the cosine of the angle between two landmark vectors. If a service path and/or a service node within a predetermined distance and operable to provide the requested service cannot be found in the global information table, then another DHT node may be searched. Also, the request may include a service requirement, such as a QoS characteristic. The global information table may store certain QoS characteristics for each node. In one example, if a service path and/or a service node operable to satisfy the service requirement cannot be found in the global information table, then another DHT node may be searched. In another example, the requesting node may determine whether a service requirement can be met, such as described with respect to step 704 in the method 700.

Figure 7:
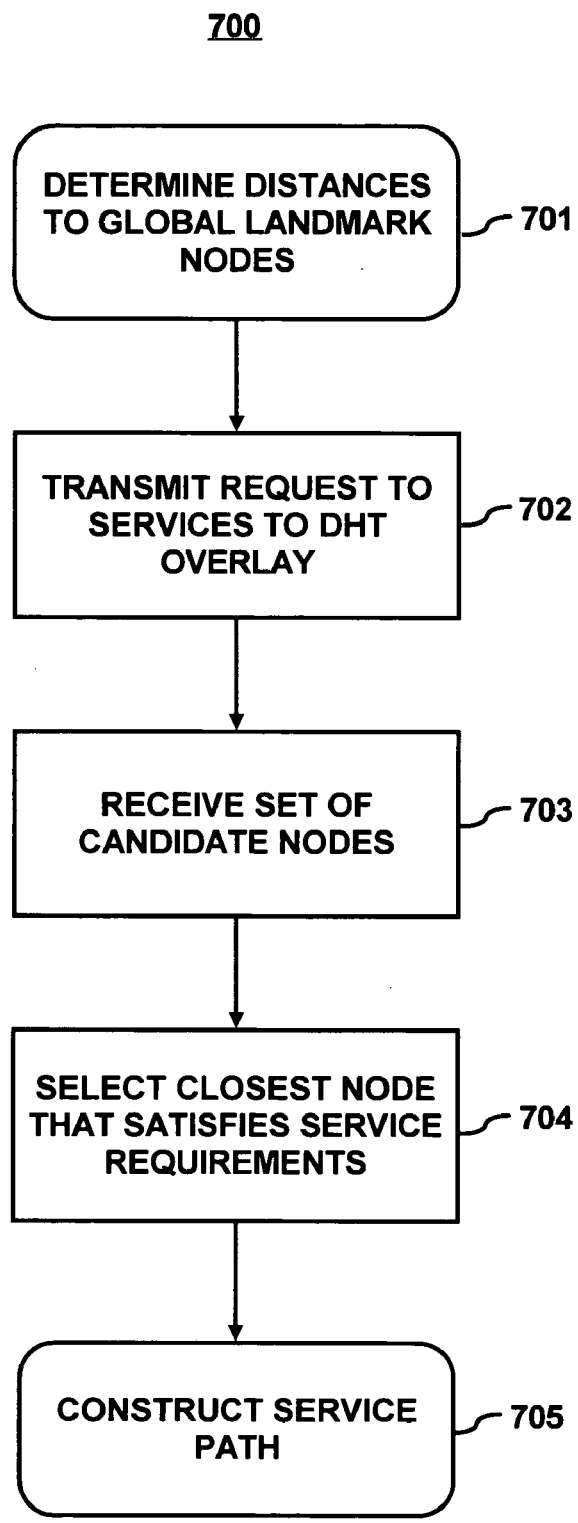
FIG. 7 illustrates a flow chart of a method for selecting a node to provide a requested service, according to an embodiment.

FIG. 7 illustrates a flow chart of a method 700 for identifying a service node for providing a requested service according to an embodiment. FIG. 7 is described with respect to the network 100 shown in FIGS. 1 and 2 and the overlay network 300 shown in FIGS. 3 and 4 by way of example and not limitation. At step 701, the node 31 determines distances to the global landmark nodes in the network 100. For example, the node 31 measures distances to the global landmark nodes GL1 and GL2, shown in FIG. 3, using RTT or another network metric.

At step 702, the node 31 transmits a request for services to the DHT overlay network 300 shown in FIG. 3. This may include the node 31 hashing the global portion of its landmark vector to identify a point in the DHT overlay network 300. The node 31 transmits the request to a node, such as the node 301, in the DHT overlay network 300 owning the zone where the identified point is located. The request includes a service path expression identifying one or more requested services and service requirements, if any.

At step 703, the node 31 receives a list of a set of candidate nodes from the node 301 that can provide the requested service. Steps 605 and 607 in the method 600 described above are performed by the node 301 to identify the set of candidate nodes.

At step 704, the node 31 selects a closest node that satisfies service path requirements from the set of candidate nodes. Service path requirements may be provided in the service path expression that also includes the requested services. The service path requirements include QoS characteristics for providing the requested services. For example, the node 31 measures distance to each of the subset of candidate nodes. The node 31 may also measure for service path requirements, such as delay and bandwidth between the node 31 and the subset of candidate nodes. A service node, such as the service node 22 shown in FIG. 1, from the subset of candidate nodes is selected that is closest to the node 31 and that can meet the requested service path requirements. Certain QoS characteristics, such as node storage capacity or processing capacity, may also be determined by each of the set of candidate nodes and transmitted to the node 31.

Figure 8A:
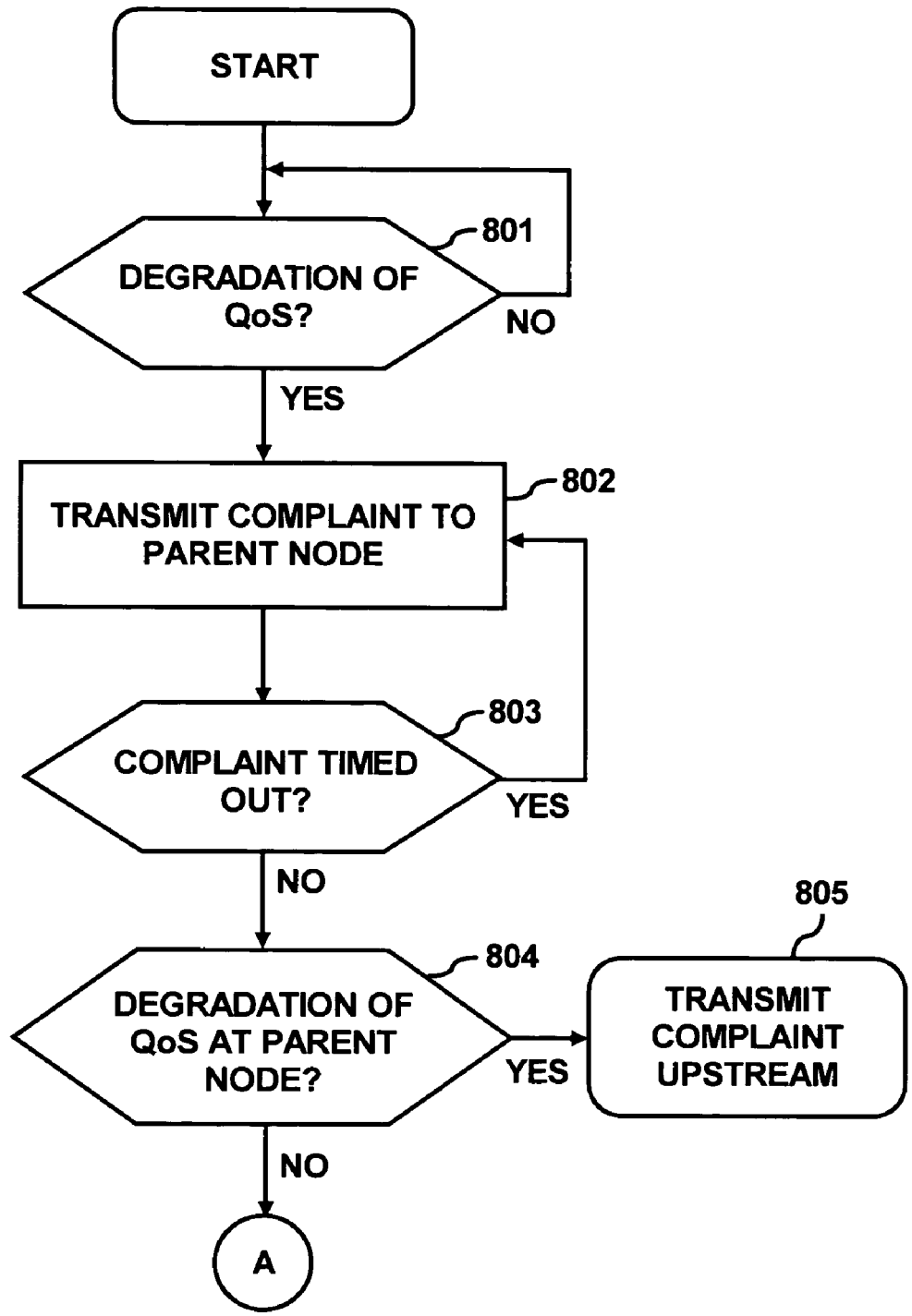
FIGS. 8A-8B illustrate a flow chart of a method for reconfiguring a multicast tree in response to a perceived degradation of QoS, according to an embodiment.
Figure 8B:
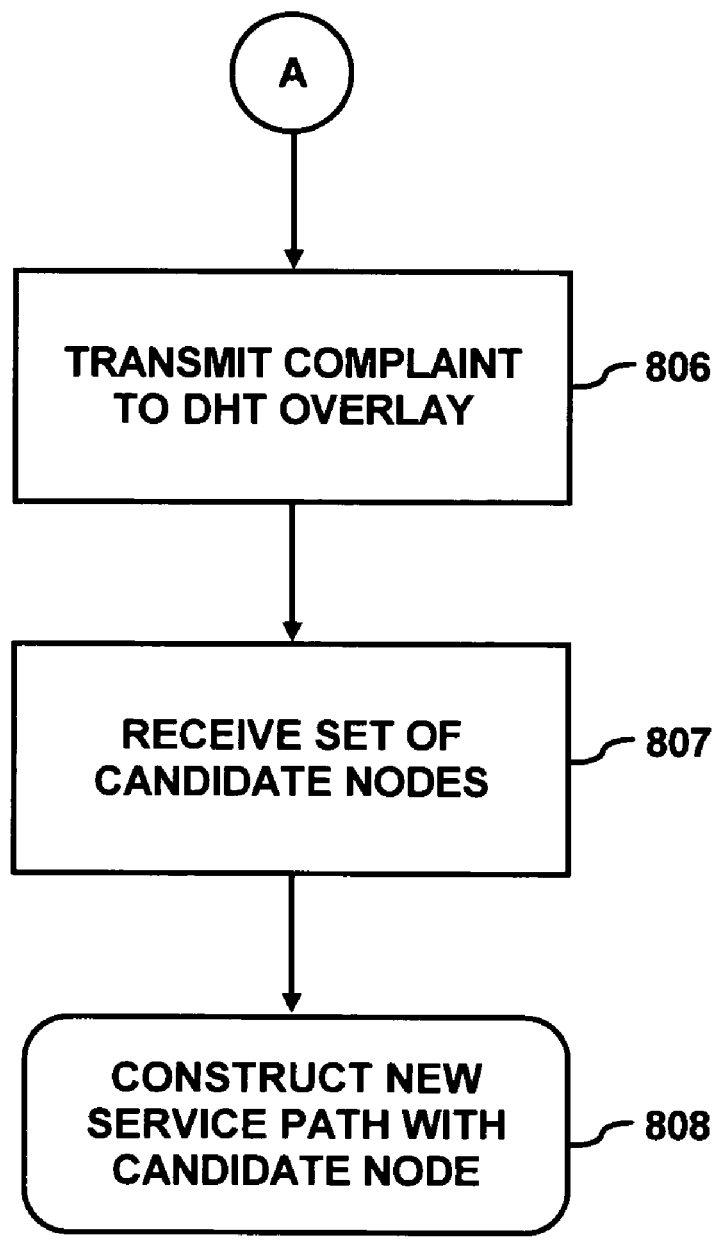

FIGS. 8A-B illustrate a method 800 for reconfiguring a multicast tree in response to a perceived degradation of QoS, according to an embodiment. FIGS. 8A-B are described with respect to the network 100 shown in FIGS. 1 and 2 and the overlay network 300 shown in FIGS. 3 and 4 by way of example and not limitation. At step 801, the user node 31 determines whether it perceives a degradation of QoS. Perceived QoS may be measured by a client application at a node. For example, the node measures predetermined QoS characteristics associated with a delivered service. If a QoS characteristic falls below a threshold, then the node generates a reconfiguration request. Also, a user using the node may perceive degradation in quality, such as periodic pauses in received streaming video or music. User input, such as pressing a key on a keyboard or clicking a mouse, may be used to initiate a reconfiguration. The degradation of QoS may be caused by a child-parent link or a link upstream. As described above, a link may include nodes and a routing path between the nodes. Thus, a degradation in QoS may be caused by the routing path or the nodes in the link. For example, a problematic link may result from a metric associated with the routing path, such as delay in the routing path. A problematic link may result from a metric associated with a node in the link, such as computing capacity or forwarding capacity. For example, in a child-parent link including the user node 31 and the service node 22 shown in FIG. 1, a metric associated with forwarding functions (e.g., forwarding capacity) of the service node 22 may cause a degradation of QoS perceived at the user node 31. For an upstream link of the child-parent link, such as the upstream link including the service node 21 and the service node 22, metrics associated with receiving functions of the service node 22 may result in a degradation of QoS perceived at the user node 31 and/or the service node 22. It will be apparent to one of ordinary skill in the art that other types of link characteristics may cause a perceived degradation of QoS, such as noise, bandwidth, inoperative node, etc.

At step 802, the user node 31 transmits a complaint to its parent node in the multicast tree 110, such as the service node 22, in response to detecting a degradation of QoS. The complaint is a message indicating that there is a problem with the received services at the user node 31 and may also include the landmark vector for the user node 31.

At step 803, the user node 31 determines whether the complaint has timed out. That is whether the user node 31 received a response to the complaint within a predetermined period of time. If the complaint timed out, then the user node 31 retransmits the complaint to the service node 22 at step 802. The step 803 may be performed periodically throughout the method 800 until the complaint times out or until the child node transmitting the complaint receives notification that the complaint is being acted upon. This may include receiving a set of candidate nodes at step 807. An example of the complaint timing out is when the parent node determines the problem is upstream and the parent node suppresses the complaint of the child and does not notify the child that the problem is upstream.

At step 804, the parent node, e.g., the service node 22, determines whether it perceives a degradation of QoS. If the parent node does not perceive a degradation of QoS, the degradation of QoS detected at the child node may be a result of the child-parent link. Thus, the parent node transmits the complaint from the child node, e.g., the user node 31, and the landmark vector of the child node to the DHT overlay network at step 805, such as the DHT overlay network 300 shown in FIG. 3. If the parent node perceives a degradation of QoS, then the problematic link is upstream from the parent node, and the parent node transmits a complaint to its parent node, such as the service node 21, at step 806. The parent node may perceive the degradation of service prior to receiving a complaint from the child node and transmit a complaint to its parent node before receiving the complaint from the child node. In this example, the parent node suppresses the complaint from the child node and transmits a complaint upstream in the multicast tree to determine a location of the problem in the multicast tree.

At step 807, if the parent node does not perceive a degradation of QoS, the user node 31 receives a set of candidate nodes from the DHT overlay network 300. The user node 31 selects one of the candidate nodes as a new parent node to receive services therefrom, such as described with respect to the method 700. At step 808, a new service path is constructed to the new parent node. To minimize disruption of service, multi-homing is performed at the multicast overlay layer during the hand-off period when switching to the new parent. For example, during handoff, the user node 31 maintains its connection with the service node 22 while establishing a connection with the new parent. The connection to the service node 22 may be terminated after packets received from the service node 22 and the new parent node are synchronized.

Figure 9:
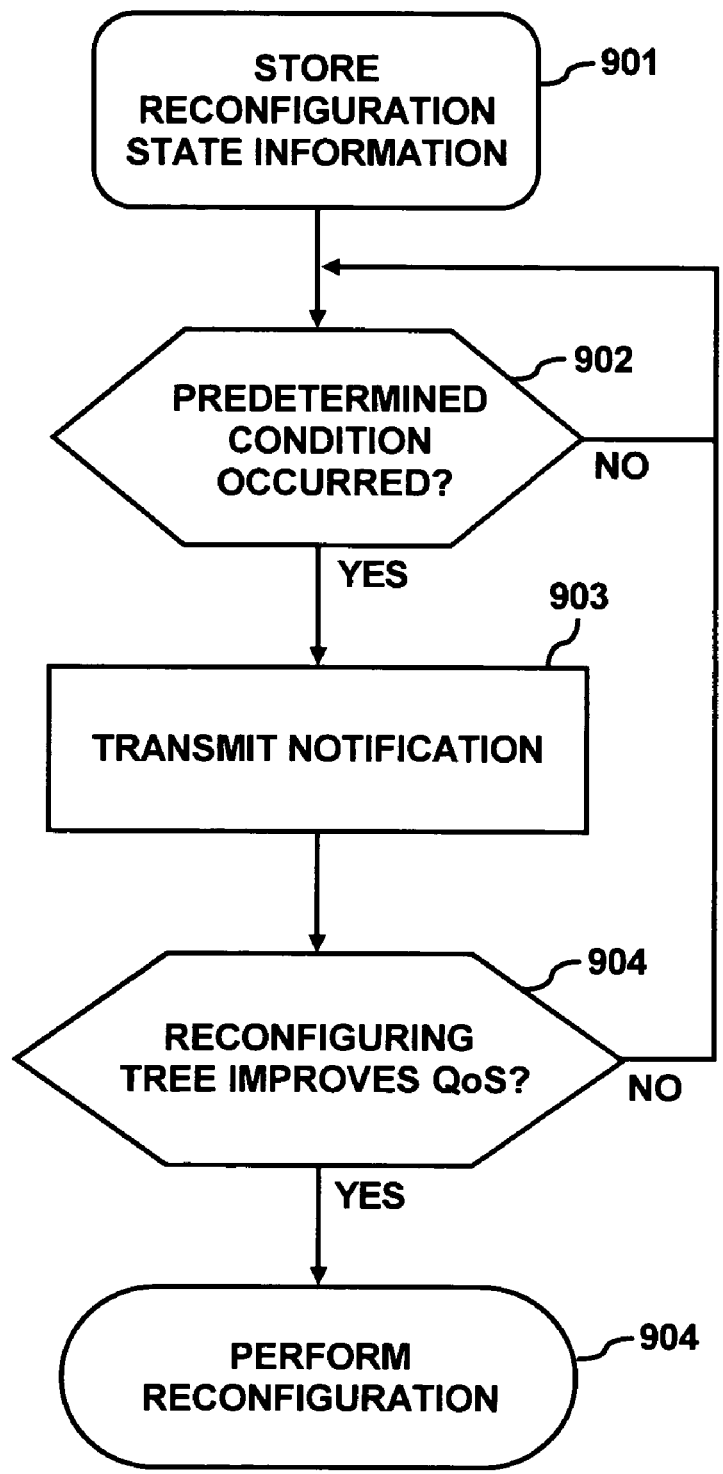
FIG. 9 illustrates a flow chart of a demand-driven method for reconfiguring a multicast tree, according to an embodiment.

FIG. 9 illustrates a demand-driven method 900 for reconfiguring a multicast tree, according to an embodiment. FIG. 9 is described with respect to the network 100 shown in FIGS. 1 and 2 and the DHT overlay network 300 shown in FIGS. 3 and 4 by way of example and not limitation. At step 901, the user node 31 stores reconfiguration state information in the global information table, for example, by hashing its landmark vector to identify a location in the DHT overlay network 300, such as the node 301 shown in FIG. 3, to store the reconfiguration state information. Reconfiguration state information is predetermined conditions that may invoke a multicast tree reconfiguration. For example, reconfiguration state information for the user node 31 shown in FIG. 1 may include notify when a new node or service path within a predetermined distance is available having a delay <20 ms and providing the requested services. Also, the predetermined conditions may be global and need not be specified for each node in the global information table. For example, the DHT overlay network 300 may evaluate the multicast tree 110 whenever a node joins or leaves the network 100. The evaluation may be performed for nodes within a predetermined distance to the node leaving or joining the network.

At step 902, the DHT overlay network 300 determines whether the predetermined conditions have occurred. This may include the predetermined conditions specified in the reconfiguration state information for the user node 31 or global predetermined conditions.

At step 903, the DHT overlay network 300 transmits notification of the occurrence of the predetermined conditions relevant to the user node 31. For example, assume the service node 20 newly joined the network 100. The DHT overlay network 300 notifies the user node 31 that the service node 20 is available and satisfies the service requirements of the user node 31.

At step 904, the user node 31 evaluates the results of the occurrence of the predetermined conditions to determine whether to reconfigure the multicast tree 100. The multicast tree 100 is reconfigured at step 905 if QoS can be improved. For example, the user node 31 measures distance to the service node 20 and determines QoS characteristics for the service node 20, such as delay in the child-parent link. The user node 31 decides whether to reconstruct the multicast tree 110 based on its measurements. For example, if the service node 20 is closer or provides better QoS than the service node 22, then a service path is constructed to the service node 20.

When switching to a new parent, multi-homing is performed to minimize disruption in service.

Figure 10:
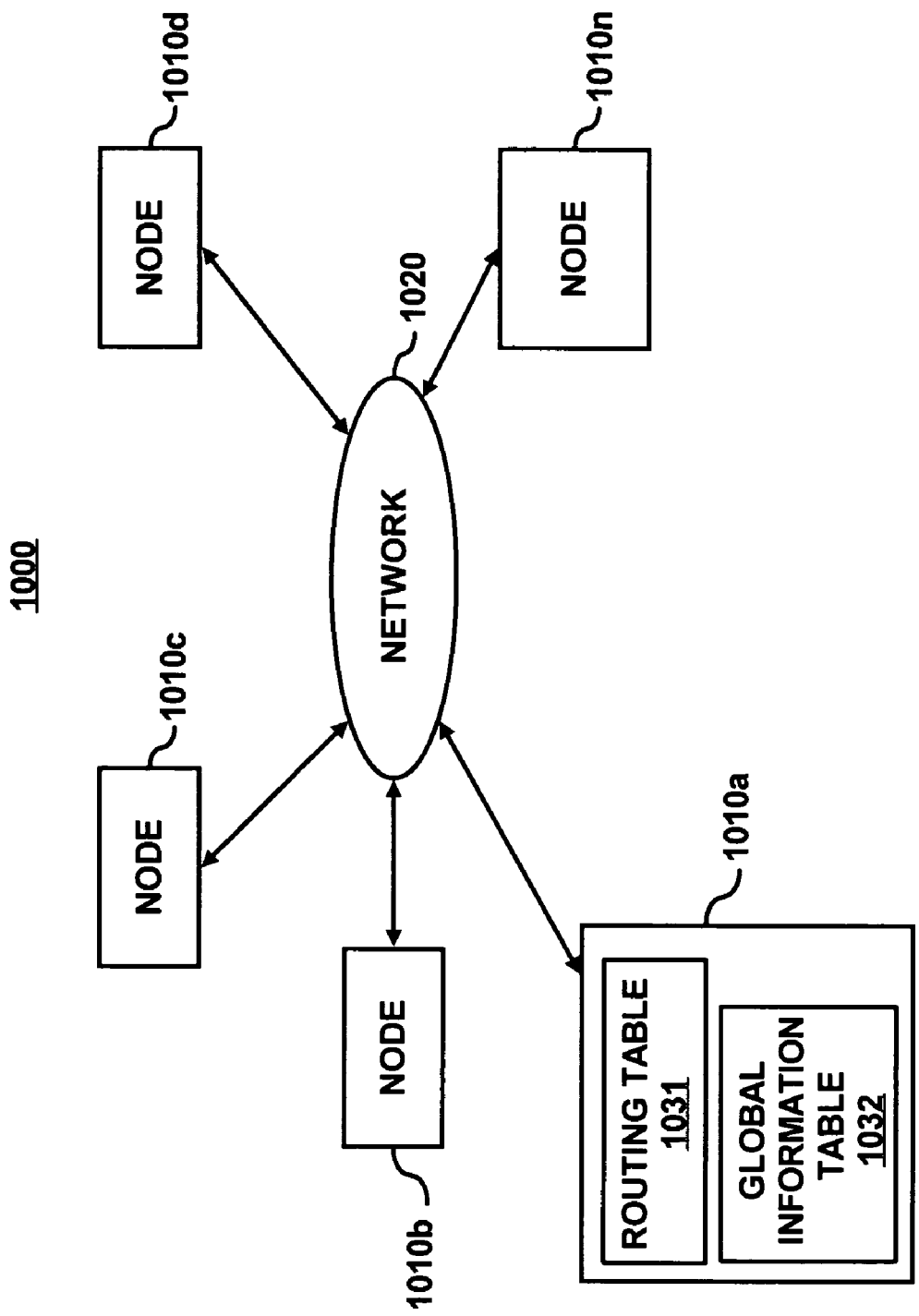
FIG. 10 illustrates a peer-to-peer system, according to an embodiment.

FIG. 10 illustrates a peer-to-peer (P2P) communications model that may be used by the underlying physical network, such as the networks 100 shown in FIGS. 1 and 2, according to an embodiment. P2P networks are commonly used as the underlying physical network for DHT overlay networks, such as the CAN DHT overlay network 300 shown in FIGS. 3 and 4. A P2P network 1000 includes a plurality of nodes 1010a . . . 101n functioning as peers in a P2P system. The nodes 1010a . . . 1010n exchange information among themselves and with other network nodes over a network 1020. The nodes 1010a . . . 1010n may also determine which nodes 1010a . . . 1010n perform other functions of a peer in a P2P system, such as object search and retrieval, object placement, storing and maintaining the global information table, etc. Objects may include files, URLs, etc. The nodes 1010a . . . 1010n may be computer systems (e.g., personal digital assistants, laptop computers, workstations, servers, and other similar devices) that have a network interface. The nodes 1010a . . . 1010n may be further operable to execute one or more software applications (not shown) that include the capability to share information (e.g., data, applications, etc.) in a P2P manner and the capability to operate as nodes in a DHT overlay network.

The network 1020 may be operable to provide a communication channel among the nodes 1010a . . . 1010n. The network 1020 may be implemented as a local area network, wide area network or combination thereof. The network 1020 may implement wired protocols, such as Ethernet, token ring, etc., wireless protocols, such as Cellular Digital Packet Data, Mobitex, IEEE 802.11b, Bluetooth, Wireless Application Protocol, Global System for Mobiles, etc., or combination thereof.

Some of the information that may be stored in the nodes 1010a . . . n is shown for node 1010a. The node 1010a stores a routing table 1031 and the global information table 1032. Information stored in the global information table is described with respect to table 1 above. The global information table may include measured distances and measured QoS characteristics. For example, if the node 1010a measures distances to each candidate node of set of candidate nodes returned from the DHT overlay network and measures QoS characteristics associated with each of the candidate nodes, the measured distances and QoS characteristics may be stored in the global information table.

Figure 11:
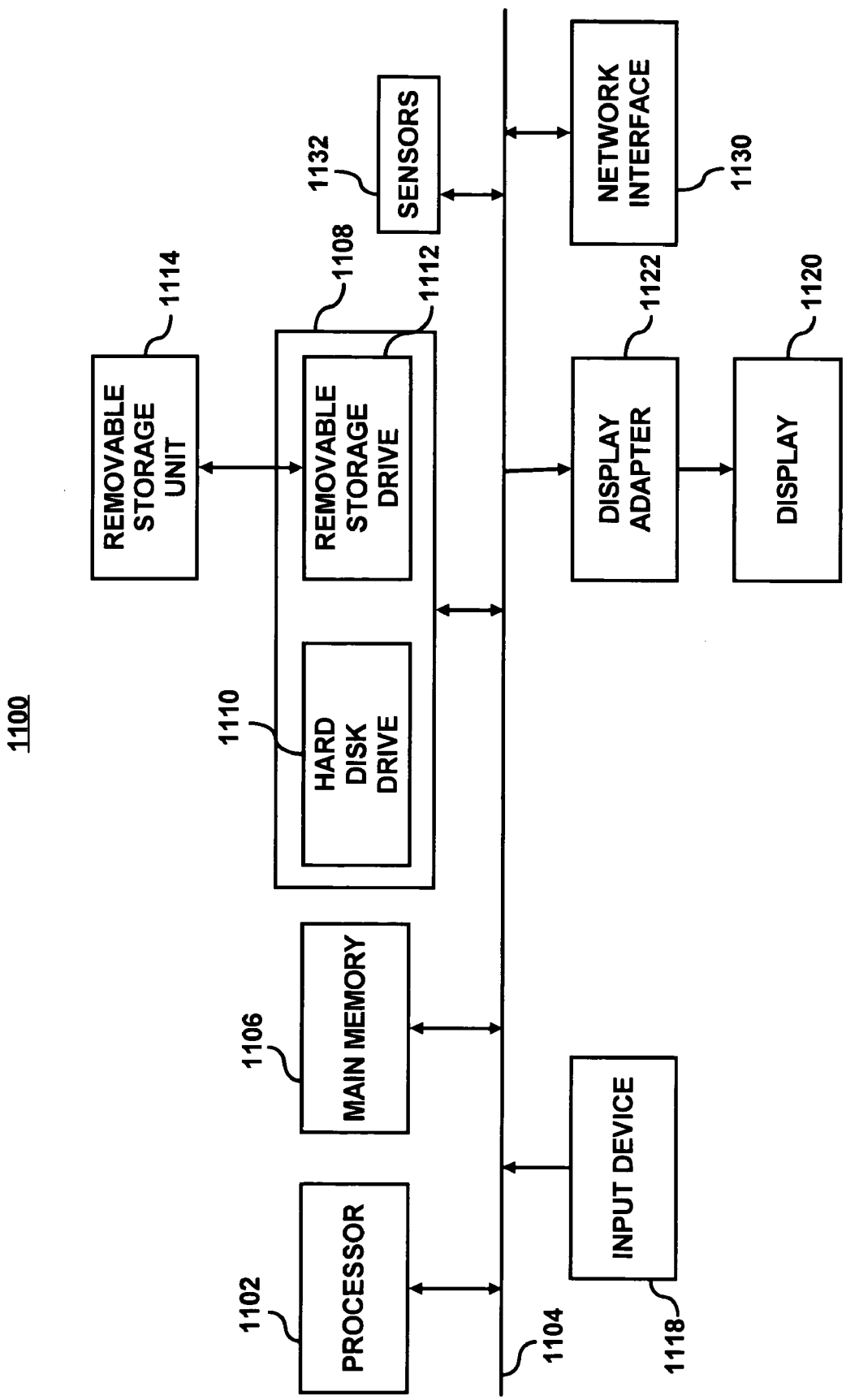
FIG. 11 illustrates a computer system that may operate as a node in the peer-to-peer system shown in FIG. 10, according to an embodiment.

FIG. 11 illustrates an exemplary block diagram of a computer system 1100 that may be used as a node in the P2P network 1000 shown in FIG. 10. The computer system 1100 includes one or more processors, such as processor 1102, providing an execution platform for executing software.

Commands and data from the processor 1102 are communicated over a communication bus 1104. The computer system 1100 also includes a main memory 1106, such as a Random Access Memory (RAM), where software may be executed during runtime, and a secondary memory 1108. The secondary memory 1108 includes, for example, a hard disk drive 1110 and/or a removable storage drive 1112, representing a floppy diskette drive, a magnetic tape drive, a compact disk drive, etc., or a nonvolatile memory where a copy of the software may be stored. The secondary memory 1108 may also include ROM (read only memory), EPROM (erasable, programmable ROM), EEPROM (electrically erasable, programmable ROM). In addition to software, routing tables, the global information table, and measured QoS characteristics may be stored in the main memory 1106 and/or the secondary memory 1108. The removable storage drive 1112 reads from and/or writes to a removable storage unit 1114 in a well-known manner.

A user interfaces with the computer system 1100 with one or more input devices 118, such as a keyboard, a mouse, a stylus, and the like. The display adaptor 1122 interfaces with the communication bus 1104 and the display 1120 and receives display data from the processor 1102 and converts the display data into display commands for the display 1120. A network interface 1130 is provided for communicating with other nodes via the network 1120 shown in FIG. 11. Also, sensors 1132 are provided for measuring QoS characteristics for the node, which may include forward capacity, load, bandwidth, etc.

One or more of the steps of the methods 500, 600, 700, 800 and 900 may be implemented as software embedded on a computer readable medium, such as the memory 1106 and/or 1108, and executed on the computer system 1100. The steps may be embodied by a computer program, which may exist in a variety of forms both active and inactive. For example, they may exist as software program(s) comprised of program instructions in source code, object code, executable code or other formats for performing some of the steps. Any of the above may be embodied on a computer readable medium, which include storage devices and signals, in compressed or uncompressed form.

Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running the computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that those functions enumerated below may be performed by any electronic device capable of executing the above-described functions.

By way of example and not limitation, some examples of the steps that may be performed by the software may include steps for determining distances to nodes and generating location information. For example, the software instructs the processor 1102 to use other hardware for generating probe packets for measuring RTT to global landmark nodes to determine distance. In another example, the software may generate a request to the global information table for identifying local landmark nodes within a predetermined proximity and measure distances to those local landmark nodes. The software includes instructions for implementing the DHT overlay network and for storing information to the global information table. The software includes instructions for hashing a landmark vector to identify a location in the DHT overlay network for transmitting a request for services or for storing information.

Other examples of steps that may be performed by the software may include steps for generating a service path expression from user input, and searching the global information table as described in the method 600. Also, software may be used to select a closest node from a set of candidate nodes that also satisfies service path requirements, as described in the method 700. Also, software may be used to reconfigure a multicast tree such as described in the methods 800 and 900.

It will be readily apparent to one of ordinary skill in the art that other steps described herein may be performed by the software. For example, if the computer system 1100 is selected as a local landmark node, the computer system 1100 may respond to received probe packets by generating an ACK message transmitted back to a node. Thus, the node transmitting the probe packet is able to determine distances to proximally located landmark nodes.

Those skilled in the art will readily recognize that various modifications to the described embodiments may be made without departing from the true spirit and scope of the embodiments. For example, it will be apparent to one of ordinary skill in the art that the advantages of storing location information as described herein can be applied to many applications, such as information storage, load balancing, congestion control, meeting service requirements, taking advantage of heterogeneity in storage capacity and forwarding capacity, etc. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method of detecting a degradation of quality of service in a multicast tree in an application layer multicast network, the method comprising:
    detecting at a child node in the multicast tree a degradation of quality of service associated with a service being received at the child node;
    determining whether the degradation of quality of service is resulting from a child-parent link or an upstream link to the child-parent link in the multicast tree, wherein the determining includes
        transmitting a complaint to a parent node of the child node, the complaint indicating a degradation of quality of service at the child node,
        if the parent node does not perceive the degradation of quality of service, a request is sent to a global information table for candidate parent nodes for the child node, and the request includes location information for the child node,
        if the parent node perceives the degradation of quality of service, the parent node sends a complaint to the parent node's parent node to determine if the parent node's parent node also perceives the degradation of quality of service, and the complaint includes location information for the parent node;
    selecting a new parent node for the child node from the candidate parent nodes in response to detecting the degradation of quality of service is resulting from the child-parent link; and
    selecting a new parent node for a child node incident to the upstream link in response to detecting the degradation of quality of service is resulting from the upstream link.

2. The method of claim 1, further comprising:
    receiving a list of the candidate nodes in response to sending the request to the global information table and the degradation of quality of service resulting from the child-parent link; and
    the selecting a new parent node includes selecting one of the candidate parent nodes from the list as the new parent node for the child node.

3. The method of claim 1, further comprising constructing a new service path in the multicast tree including the child node and the new parent node.

4. The method of claim 3, wherein constructing a new service path further comprises:
    establishing a connection to the new parent node while maintaining a connection to the parent node;
    synchronizing data received from the parent node and the new parent node; and
    terminating the connection to the parent node.

5. The method of claim 2, wherein selecting one of the candidate nodes as a new parent node for the child node comprises:
    measuring distances to each of the candidate nodes;
    determining a metric associated with the quality of service and each candidate node; and
    selecting one of the candidate nodes that is closest to the child node and that is operable to satisfy at least one quality of service characteristic.

6. The method of claim 1, wherein the location information of the child node included in the request sent to the global information table to select the candidate parent nodes that are physically close to the child node.

7. The method of claim 1, comprising:
    determining whether the complaint sent to the parent node of the child node timed out;
    retransmitting the complaint to the parent node of the child node in response to the complaint timing out.

8. The method of claim 1, wherein detecting at a child node a degradation of quality of service comprises detecting a measured quality of service characteristic associated with the received service falling below a predetermined threshold.

9. The method of claim 1, wherein detecting at a child node a degradation of quality of service comprises detecting degradation of quality of service as perceived by a user at the child node.

10. The method of claim 1, wherein quality of service includes at least one of a metric associated with processing data at a node receiving the service and a metric associated with transmitting data for the service between nodes in the multicast tree.

11. A method of determining location of degradation of quality of service in a multicast tree in an application layer multicast network, the method comprising:
    receiving a complaint from a child node at a parent node in the multicast tree, the complaint indicating a degradation of quality of service of a service being received at the child node;
    determining whether a cause of the degradation of quality of service is located in an upstream link or is located at a child-parent link wherein the determining includes
        transmitting a complaint to a parent node of the child node, the complaint indicating a degradation of quality of service at the child node,
        if the parent node does not perceive the degradation of quality of service, sending a request to a global information table for candidate parent nodes for the child node, and the request includes location information for the child node, and
        if the parent node perceives the degradation of quality of service, the parent node sends a complaint to the parent node's parent node to determine if the parent node's parent node also perceives the degradation of quality of service, and the complaint includes location information for the parent node;

selecting a new parent node for the child node from the candidate parent nodes in response to detecting the degradation of quality of service is resulting from the child-parent link; and selecting a new parent node for a child node incident to the upstream link in response to detecting the degradation of quality of service is resulting from the upstream link.

12. The method of claim 11, wherein sending a requesting comprises transmitting the location information for the child node to a distributed hash table overlay network storing the global information table.

13. The method of claim 12, wherein the global information table includes at least location information and information associated with services provided by nodes in the application layer multicast network.

14. The method of claim 13, wherein the global information table is stored in a plurality of distributed hash table nodes in the distributed hash table overlay network, such that each distributed hash table node stores information for nodes physically close in an underlying physical network.

15. The method of claim 14, wherein sending a request to a global information table comprises hashing a landmark vector of the child node to identify a distributed hash table node to transmit a request for the candidate parent nodes for the child node.

16. The method of claim 11, wherein the global information table stores information for nodes transmitting a complaint, the method comprising:

searching the global information table for the candidate parent nodes such that the candidate parent nodes do not include a node that transmitted a complaint.

17. A parent node connected to a child node in a multicast tree, the parent node comprising:

means for receiving a complaint from the child node, the complaint indicating a degradation of quality of service of a service being received at the child node; and means for determining whether quality of service associated with the service is degraded at the parent node;

means for transmitting a complaint to the parent node's parent node in the multicast tree indicating a degradation of quality of service at the parent node in response to determining at the parent node that the quality of service is degraded and as a result the degradation at the parent node is associated with an upstream link to a child-parent link for the child node and the parent node, and the complaint includes location information for the parent node;

means for requesting a list of a set of candidate nodes from a global information table in response to determining at the parent node that the quality of service is not degraded and as a result the degeneration at the child node is associated with the child-parent link, and the request includes location information for the child node, wherein each of the candidate nodes is operable to provide the service to the child node and is physically close to the child node based on the location information for the child node;

means for selecting a new parent node for the child node from the candidate nodes in response to detecting the degradation of quality of service is resulting from the child-parent link; and selecting a new parent node for a child node incident to the upstream link in response to detecting the degradation of quality of service is resulting from the upstream link.

18. The parent node of claim 17, further comprising:

means for hashing the location information for the child node to identify a location in a distributed hash table overlay network storing the global information table; and means for transmitting the location information with a request for a list of a set of candidate nodes with the location information to the identified location.

19. The parent node of claim 18, wherein the global information table includes at least location information and information associated with services provided by nodes in a network including the multicast tree.

20. The parent node of claim 19, wherein the global information table is stored in a plurality of distributed hash table nodes in the distributed hash table overlay network, such that each distributed hash table node stores information for nodes physically close in the network.

21. Computer software embedded on a computer readable storage device, the computer software comprising instructions performing:

detecting at a child node in a multicast tree a degradation of quality of service associated with a service being received at the child node;

determining whether the degradation of quality of service is resulting from a child-parent link or an upstream link to the child-parent link in the multicast tree, wherein the determining includes transmitting a complaint to a parent node of the child node, the complaint indicating a degradation of quality of service at the child node, if the parent node does not perceive the degradation of quality of service, a request is sent to a global information table for candidate parent nodes for the child node, and the request includes location information for the child node, if the parent node perceives the degradation of quality of service, the parent node sends a complaint to the parent node's parent node to determine if the parent node's parent node also perceives the degradation of quality of service, and the complaint includes location information for the parent node;

selecting a new parent node for a child node incident to the upstream link in response to detecting the degradation of quality of service is resulting from the upstream link; and selecting a new parent node for the child node from the candidate parent nodes in response to detecting the degradation of quality of service is resulting from the child-parent link.

22. The method of claim 1, wherein selecting a new parent node for the child node from the candidate parent nodes further comprises, at the parent node, sending the request to a distributed hash table overlay network storing the global information table.

23. The method of claim 1, further comprising:

using the location information for the parent node to identify candidate parent nodes for the parent node if the parent's node parent node also perceives the degradation of quality of service.

* * * * *

UNITED STATES PATENT AND TRADEMARK OFFICE
CERTIFICATE OF CORRECTION

PATENT NO. : 7,644,182 B2  Page 1 of 1
APPLICATION NO. : 10/797200
DATED : January 5, 2010
INVENTOR(S) : Sujata Banerjee et al.

It is certified that error appears in the above-identified patent and that said Letters Patent is hereby corrected as shown below:

In column 24, line 27, in Claim 7, before "comprising:" insert -- further --.

In column 25, line 54, in Claim 17, delete "degredation" and insert -- degradation --, therefor.

Signed and Sealed this

Fifth Day of October, 2010

David J. Kappos
*Director of the United States Patent and Trademark Office*